US011500625B2

(12) United States Patent
Christian et al.

(10) Patent No.: US 11,500,625 B2
(45) Date of Patent: Nov. 15, 2022

(54) METHOD, APPARATUS, AND COMPUTER PROGRAM PRODUCT FOR ORGANIZING THE BOOTING OPERATION OF A GROUP-BASED COMMUNICATION BROWSER SESSION

(71) Applicant: SLACK TECHNOLOGIES, INC., San Francisco, CA (US)

(72) Inventors: Mark Christian, Benicia, CA (US); Anuj Nair, Millbrae, CA (US); James Whimpey, San Francisco, CA (US); Drew Schuster, San Francisco, CA (US)

(73) Assignee: Slack Technologies, LLC, San Francisco, CA (US)

( * ) Notice: Subject to any disclaimer, the term of this patent is extended or adjusted under 35 U.S.C. 154(b) by 54 days.

(21) Appl. No.: 16/588,731

(22) Filed: Sep. 30, 2019

(65) Prior Publication Data

US 2021/0099519 A1    Apr. 1, 2021

(51) Int. Cl.
*G06N 20/20* (2019.01)
*G06F 8/656* (2018.01)
(Continued)

(52) U.S. Cl.
CPC .............. *G06F 8/656* (2018.02); *G06F 21/33* (2013.01); *G06F 21/575* (2013.01);
(Continued)

(58) Field of Classification Search
CPC ............. H04L 67/1044; H04L 12/1822; H04L 12/1831; H04L 65/1069; H04L 65/1089; H04L 67/02
See application file for complete search history.

(56) References Cited

U.S. PATENT DOCUMENTS 7,693,958 B2 * 4/2010 Teodosiu ............. G06Q 10/107
709/217
7,950,026 B1 * 5/2011 Urbach .................. H04L 69/03
719/329

(Continued)

OTHER PUBLICATIONS

"Die, Email, Die! A Flickr Cofounder Aims to Cut Us All Some Slack", Readwriteweb, Lexisnexis, https://advance.lexis.com/api/permalink/33dd79e2-90f5-409d-ae27-5a2c7e86bf31/?context=1000516>. (dated Aug. 14, 2013, 4:15 PM) 2 pages.

(Continued)

*Primary Examiner* — Abdullahi E Salad
(74) *Attorney, Agent, or Firm* — Erise IP, P.A.

(57) ABSTRACT

Various methods, apparatuses, and computer program products are provided for initiating a group-based communication browser session. An example computer-implemented method includes generating a group-based communication browser session initiation request via a processor of the apparatus. The computer-implemented method also includes loading a boot data object. The boot data object includes one or more predefined parameters of a booting operation stored locally on the client device and the boot data object is applicable to a plurality of executable software applications. The computer-implemented method further includes downloading at least one asset data and application data based on a specific application of the plurality of executable software applications from a group-based communication system. The at least one of the asset data and the application data is configured for generation of at least a portion of a display associated with the group-based communication browser session. Corresponding apparatuses and computer program products are also provided.

17 Claims, 11 Drawing Sheets

(51) Int. Cl.
| | |
|---|---|
| *H04L 65/403* | (2022.01) |
| *H04L 65/1066* | (2022.01) |
| *H04L 67/02* | (2022.01) |
| *H04L 67/00* | (2022.01) |
| *H04L 12/18* | (2006.01) |
| *H04L 65/1069* | (2022.01) |
| *H04L 65/1089* | (2022.01) |
| *H04L 67/104* | (2022.01) |
| *G06F 21/33* | (2013.01) |
| *G06F 21/57* | (2013.01) |
| *H04L 51/18* | (2022.01) |
| *H04L 67/568* | (2022.01) |

(52) U.S. Cl.
CPC ...... *H04L 12/1822* (2013.01); *H04L 12/1831* (2013.01); *H04L 51/18* (2013.01); *H04L 65/1066* (2013.01); *H04L 65/1069* (2013.01); *H04L 65/1089* (2013.01); *H04L 65/403* (2013.01); *H04L 67/02* (2013.01); *H04L 67/1044* (2013.01); *H04L 67/34* (2013.01); *H04L 67/568* (2022.05)

(56) References Cited

U.S. PATENT DOCUMENTS

| | | | | | |
|---|---|---|---|---|---|
| 8,346,868 | B2* | 1/2013 | Nakajima | ............... | H04L 67/34 709/205 |
| 8,788,949 | B2* | 7/2014 | Hunt | ............... | G06Q 10/10 715/753 |
| 9,213,230 | B1* | 12/2015 | Amidon | ............... | G06Q 10/107 |
| 9,648,058 | B2* | 5/2017 | Tseng | ............... | H04L 67/24 |
| 9,811,326 | B2* | 11/2017 | Shlomai | ............... | G06F 9/455 |
| 10,587,559 | B2* | 3/2020 | Chen | ............... | G06F 3/04847 |
| 10,931,811 | B2* | 2/2021 | Zhong | ............... | H04L 51/30 |
| 11,095,583 | B2* | 8/2021 | Katis | ............... | H04L 51/14 |
| 2003/0105819 | A1* | 6/2003 | Kim | ............... | G06F 16/954 709/205 |
| 2009/0307612 | A1* | 12/2009 | Singh | ............... | G06Q 10/10 715/758 |
| 2013/0054535 | A1* | 2/2013 | Ledoux | ............... | G06F 8/61 707/654 |
| 2018/0287982 | A1 | 10/2018 | Draeger et al. | | |

OTHER PUBLICATIONS

"How Slack changed the way we work by putting the customer experience first", Repeat Customer Podcast, Episode 3, [online][retrieved May 9, 2019]. Retrieved from the Internet: <URL: https://www.zendesk.com/resources/slack-customer-experience/, (2019) 13 pages.

Adrienne LaFrance, "The Triumph of Email", Atlantic Online, Lexisnexis, https://advance.lexis.com/api/permalink/32d7ddd9-d4c1-4a73-86f7-08ab5842fde6/?context=1000516, (dated Jan. 6, 2016) 5 pages.

David Auerbach, "Re-Animator. How Stewart Butterfield created Flickr and Slack out of the ashes of failed projects" [online][retrieved May 9, 2019]. Retrieved from the Internet: <URL: https://slate.com/business/2014/05/stewart-butterfield-flickr-and-slack-how-he-snatched-victory-from-the-jaws-of-defeat.html>. (dated May 28, 2014, 2:48 PM) 8 pages.

Ernie Smith, "Picking Up The Slack", Tedium, [online][retrieved May 9, 2019]. Retrieved from the Internet: <URL: https://tedium.co/2017/10/17/irc-vs-slack-chat-history/>. (dated Oct. 17, 2017) 8 pages.

Internet Relay Chat, Wikipedia, [online][retrieved May 30, 2019]. Retrieved from the Internet: <URL: https://en.wikipedia.org/wiki/Internet_Relay_Chat> (dated May 28, 2019) 17 pages.

Jonathan Vanian, "Why these startups think chat apps are the next big thing in workplace collaboration", Gigaom, Lexisnexis, https://advance.lexis.com/api/permalink/e83778c8-09c8-43aa-9ba0-88526283de69/?context=1000516, (dated Aug. 1, 2014, 5:45 PM) 4 pages.

Matsumoto, T. et al., "Chocoa Communicator—A New Communication System Based on Awareness and Text Communications-", Fujitsu Sci. Tech J., 36, 2, (Dec. 2000) 154-161.

Matthew Ingram, "Flickr co-founder launches Slack, an all-in-one messaging tool designed to kill email forever", Gigaom, Lexisnexis, https://advance.lexis.com/api/permalink/0b676b7c-aec3-4560-861e-d030d1dd008c/?context=1000516, (dated Feb. 12, 2014,7:03 PM), 2 pages.

Michael Carney, "Slack is thriving on a cocktail of whimsy and great timing", Pandodaily, Lexisnexis, https://advance.lexis.com/api/permalink/dd2d4ee5-2ddf-4d3a-a1d9-3bcee5e38b74/?context=1000516, (dated Feb. 6, 2015, 2:12 AM) 3 pages.

Mike Issac, "Slack, a Start-Up With an App to Foster Business Collaboration, Is Valued at $1.1 Billion", The New York Times Blogs (Bits), Lexisnexis, https://advance.lexis com/api/permalink/3eb84b34-a8f9-4d7d-9573-89d9598a4963/?context=1000516>(dated Oct. 31, 2014) 2 pages.

Oikarinen, J. & Reed, D., "Internet Relay Chat Protocol", Request for Comments: 1459, Network Working Group, [online][retrieved May 30, 2019]. Retrieved from the Internet: <URL: https://www.rfc-editor.org/rfc/rfc1459.txt>. (dated May 1993) 66 pages.

Rebecca Walberg, "Email biggest office waste of time: survey", National Post, At FP10, Lexisnexis, https://advance.lexis.com/api/permalink/96268e3f-26ad-48ac-a98f-6c39804ebded/?context=1000516, (dated Mar. 4, 2014) 2 pages.

Robert Hof, "Stewart Butterfield on How Slack Became a $2.8 Billion Unicorn", Forbes, [online][retrieved May 9, 2019]. Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015, 3;25 PM), 3 pages.

The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 27 pages.

* cited by examiner

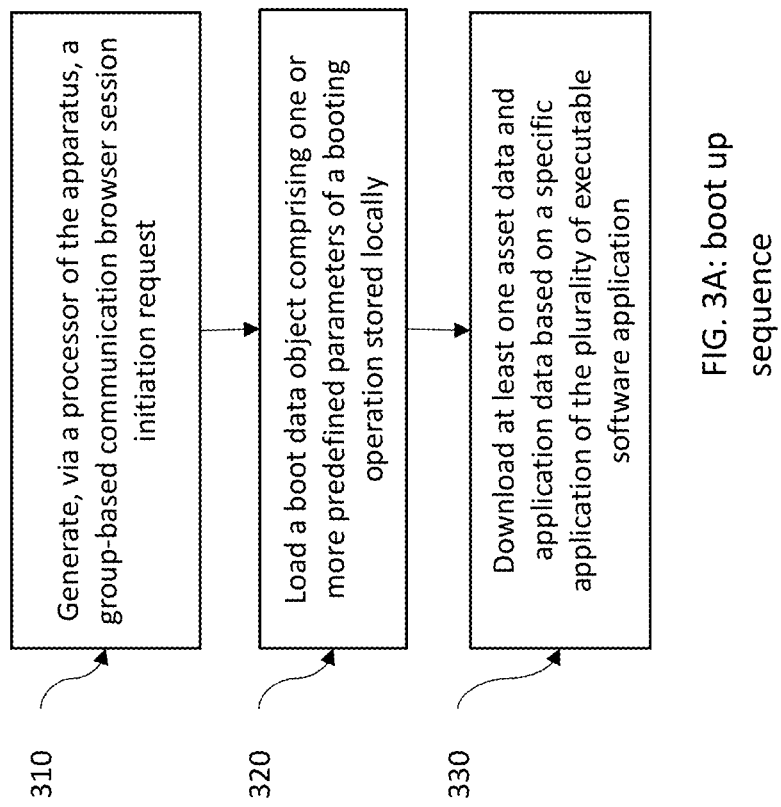
FIG. 3A: boot up sequence

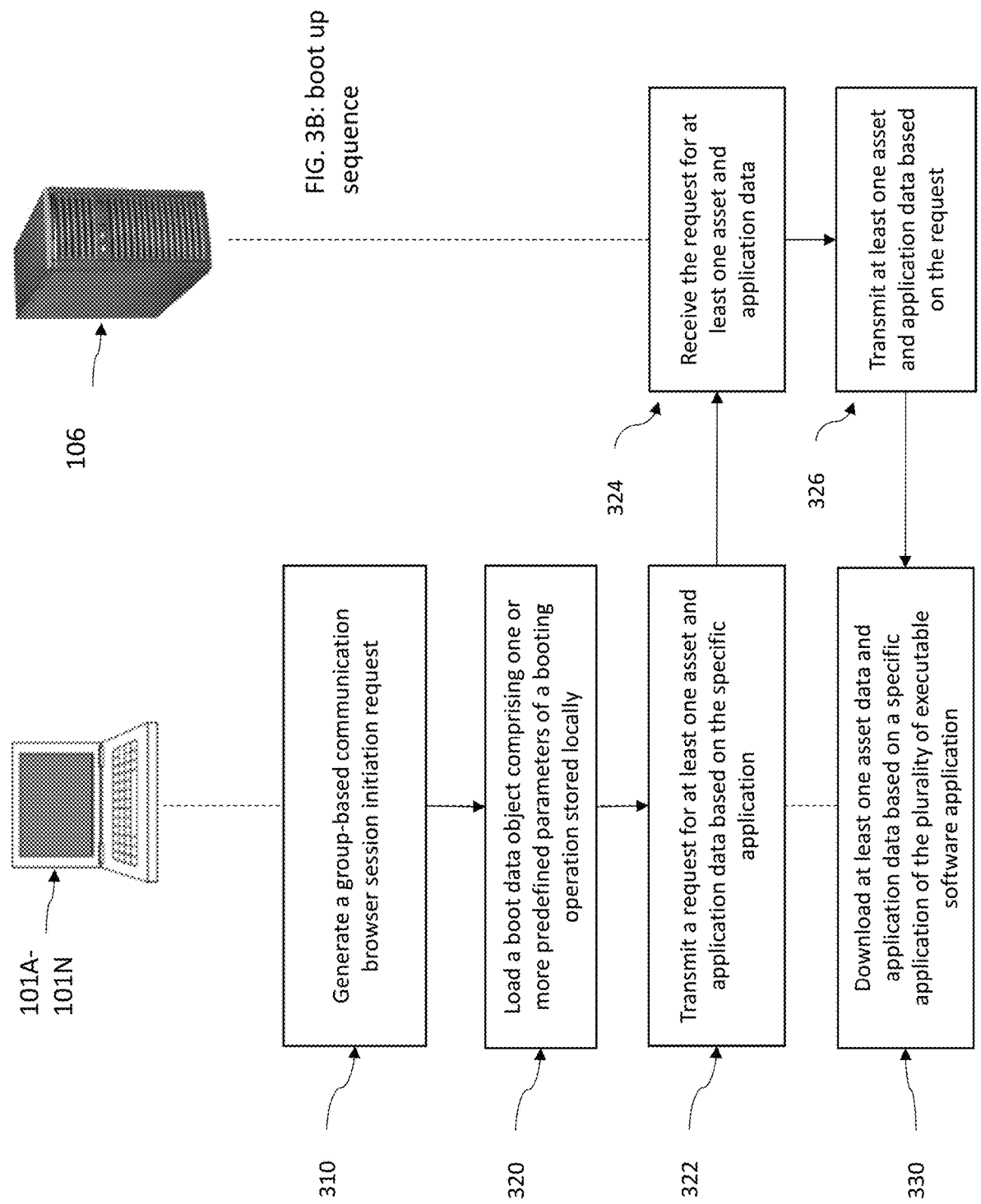

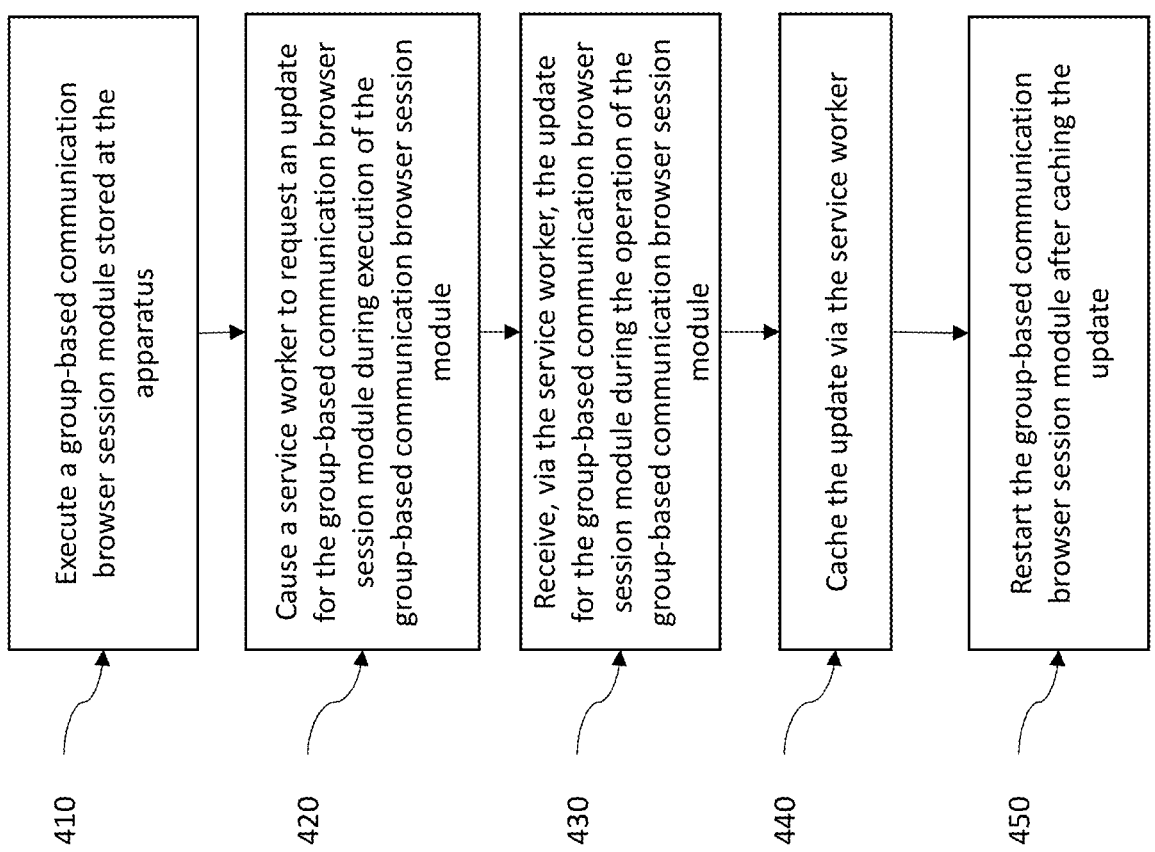

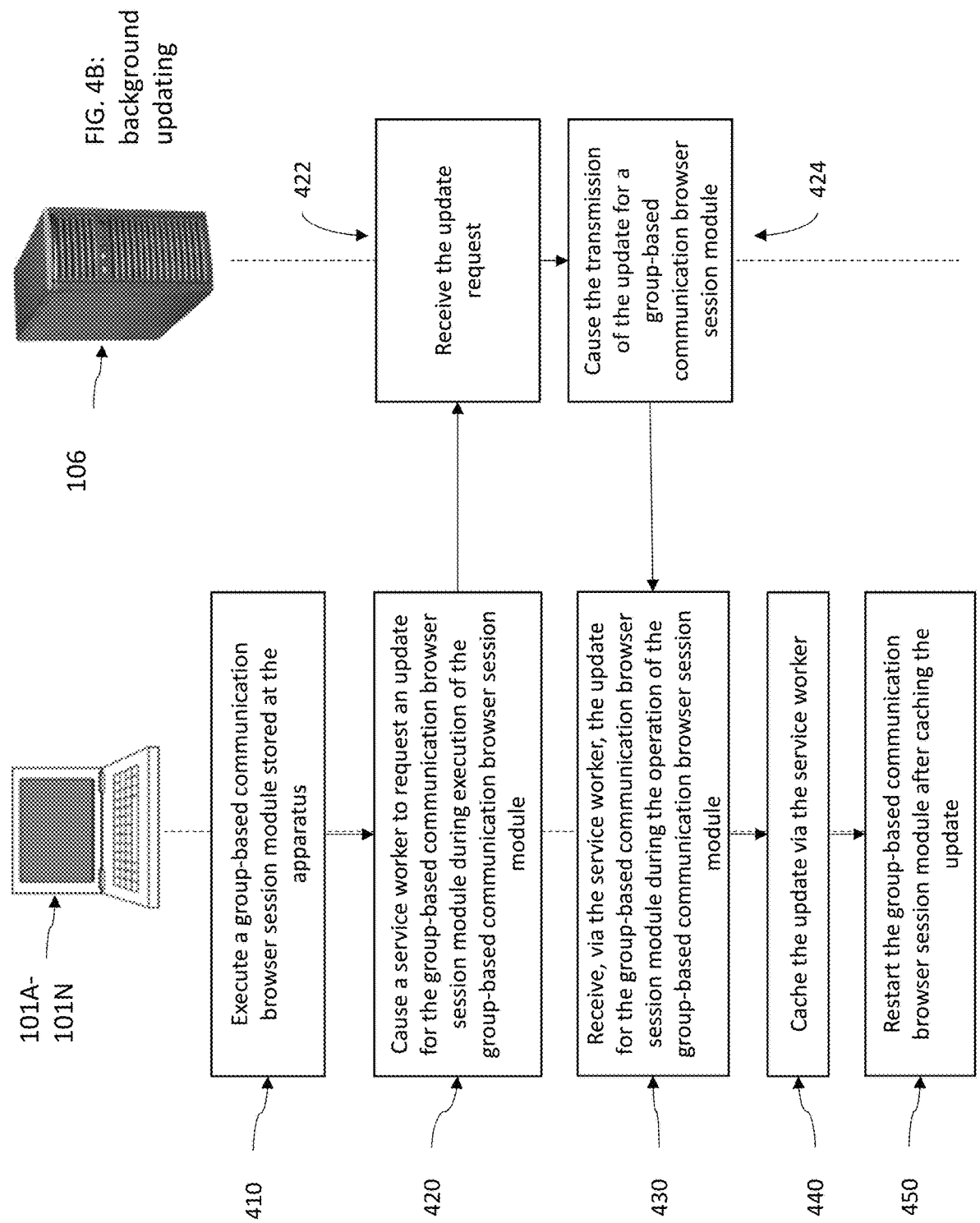

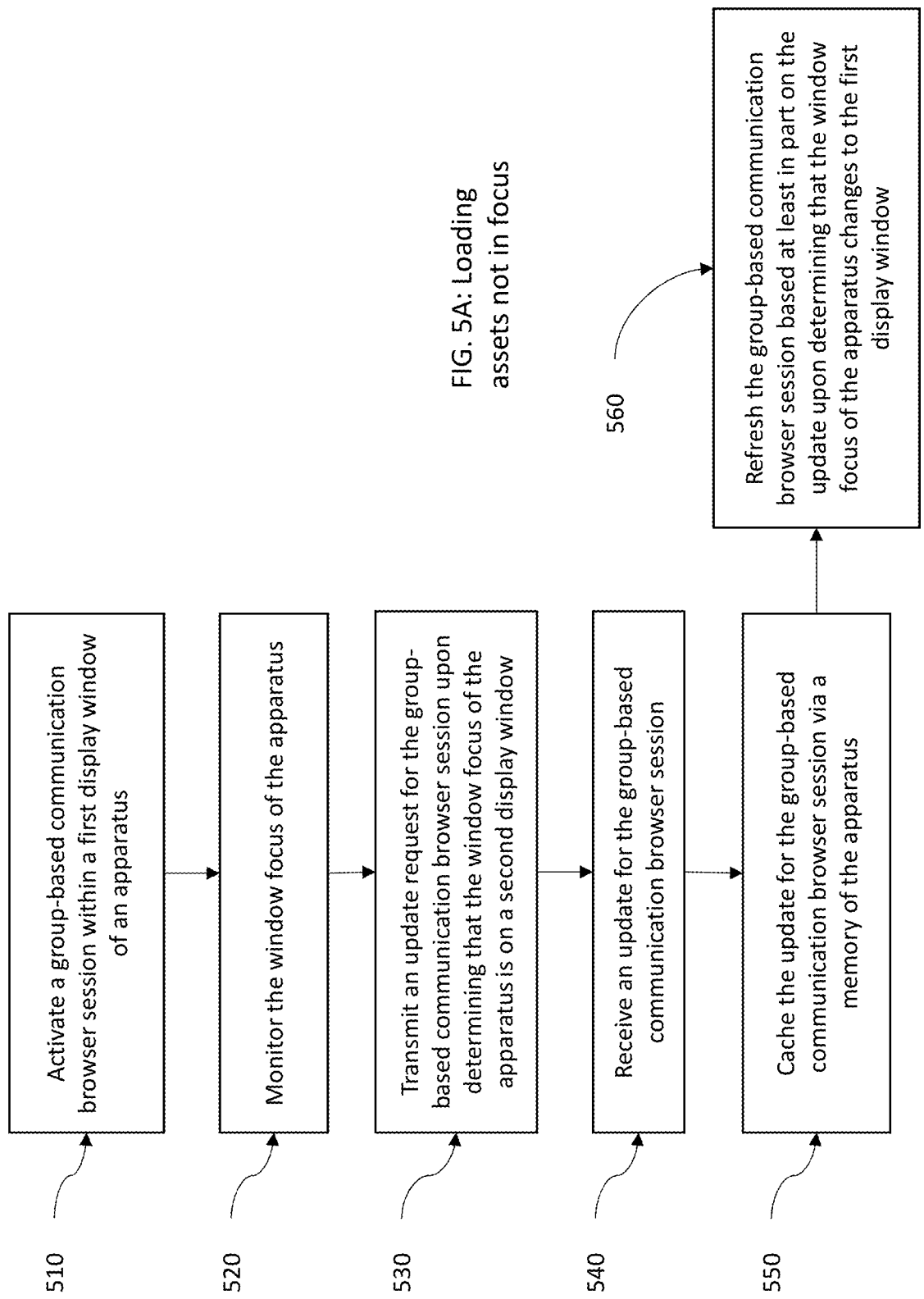

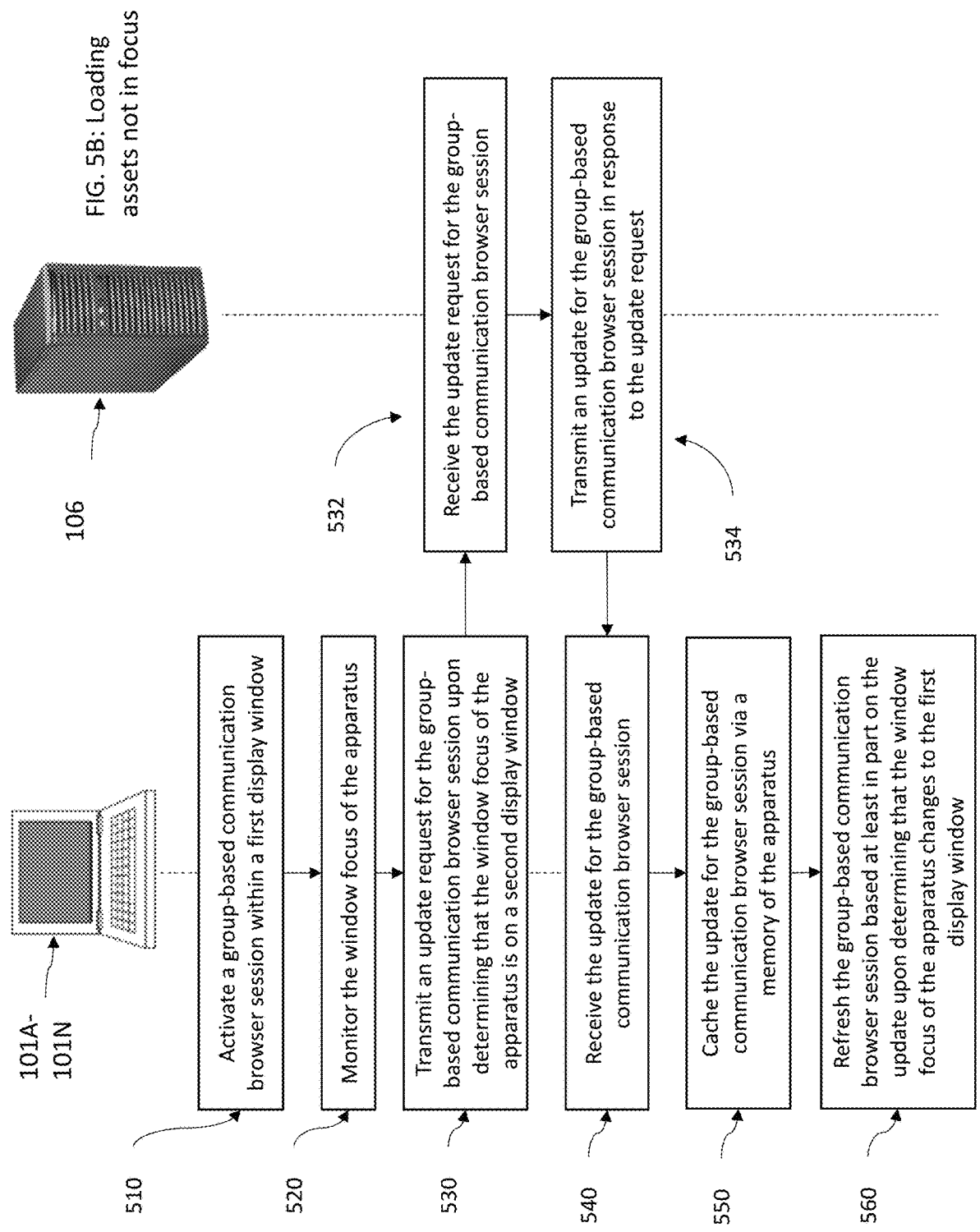
FIG. 5B: Loading assets not in focus

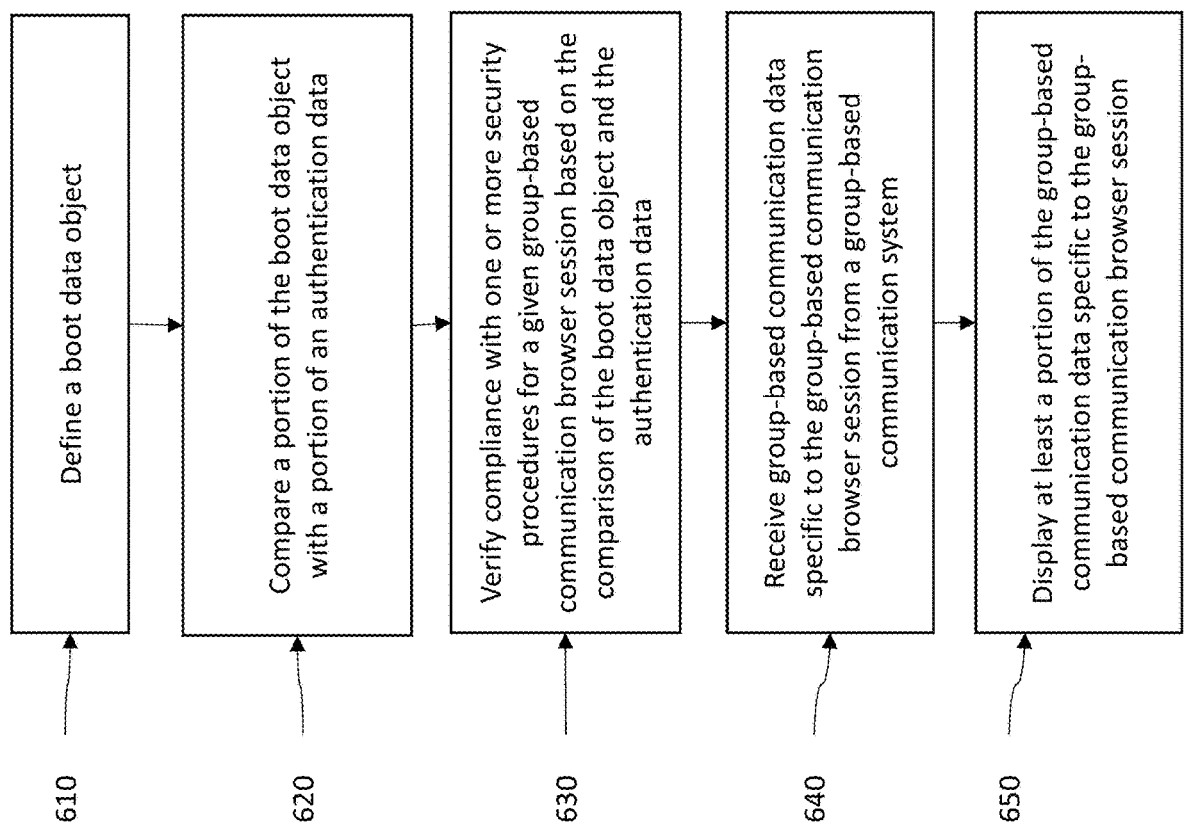

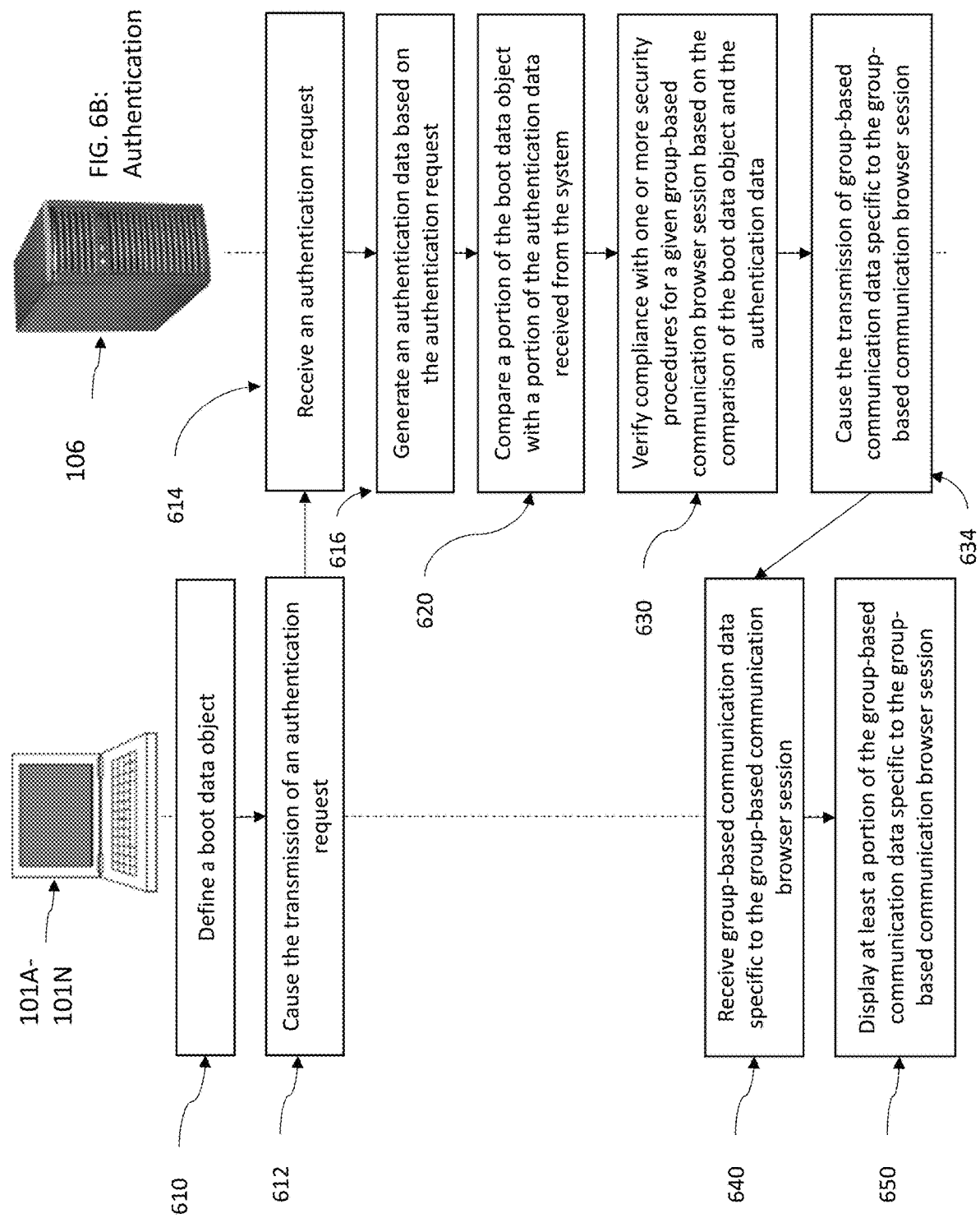

METHOD, APPARATUS, AND COMPUTER PROGRAM PRODUCT FOR ORGANIZING THE BOOTING OPERATION OF A GROUP-BASED COMMUNICATION BROWSER SESSION

TECHNOLOGICAL FIELD

Embodiments relate, generally, to organizing booting operations, and more specifically, to using service workers operating in the background of a software application to update applications for future usage.

BACKGROUND

Various messaging systems may support communication and collaboration among users across an enterprise. Applicant has identified a number of deficiencies and problems associated with collaborative communication environments. Through applied effort, ingenuity, and innovation, many of these identified problems have been solved by developing solutions that are included in embodiments of the present disclosure, many examples of which are described in detail herein.

BRIEF SUMMARY

In general, embodiments of the present invention provided herein include methods, apparatus, and computer program products for executing a group-based communication browser session. In an example embodiment, an apparatus is provided for initiating a group-based communication browser session. The apparatus includes at least one processor and at least one non-transitory memory including program code, the at least one non-transitory memory and the program code configured to, with the processor, cause the apparatus to at least generate, via a processor of the apparatus, a group-based communication browser session initiation request. The computer program code instructions may also be configured to, when executed, cause the apparatus to load a boot data object. The boot data object includes one or more predefined parameters of a booting operation stored locally on the client device and the boot data object is applicable to a plurality of executable software applications. The computer program code instructions may further be configured to, when executed, cause the apparatus to download, from a group-based communication system, at least one asset data and application data based on a specific application of the plurality of executable software application. The at least one of the asset data and the application data is configured for generation of at least a portion of a display associated with the group-based communication browser session.

In some embodiments, the boot data object includes a static HTML payload. In some embodiments, the static HTML payload is constant for the plurality of executable software applications. In some embodiments, downloading at least one asset data and application data includes downloading the asset data and the application data in parallel. In some embodiments, one or more of the asset data or application data is stored in memory on the apparatus. In some embodiments, the computer program code instructions may also be configured to, when executed, cause the apparatus to generate a display associated with the group-based communication browser session while the apparatus is unconnected from the group-based communication system. In some embodiments, generation of the group-based communication browser session initiation request includes generating the group-based communication browser session initiation request based at least in part on received user input.

In another example embodiment, a computer-program product is provided for initiating a group-based communication browser session. The computer program product includes at least one non-transitory computer-readable storage medium having computer-readable program code portions stored therein, the computer-readable program code portions includes an executable portion configured to generate, via a processor of the apparatus, a group-based communication browser session initiation request. The computer-executable program code portions also include program code instructions configured to load a boot data object. The boot data object includes one or more predefined parameters of a booting operation stored locally on the client device and the boot data object is applicable to a plurality of executable software applications. The computer-executable program code portions further include program code instructions configured to download, from a group-based communication system, at least one asset data and application data based on the specific application of the plurality of executable software application. The at least one of the asset data and the application data is configured for generation of at least a portion of a display associated with the group-based communication browser session.

In some embodiments, the boot data object includes a static HTML payload. In some embodiments, the static HTML payload is constant for the plurality of executable software applications. In some embodiments, downloading at least one asset data and application data includes downloading the asset data and the application data in parallel. In some embodiments, one or more of the asset data or application data is stored in memory on the apparatus. In some embodiments, the executable portion is further configured for generating a display associated with the group-based communication browser session while the apparatus is unconnected from the group-based communication system. In some embodiments, generation of the group-based communication browser session initiation request includes generating the group-based communication browser session initiation request based at least in part on received user input.

In yet another example embodiment, a computer-implemented method is provided for initiating a group-based communication browser session. The computer-implemented method includes generating, via a processor of the apparatus, a group-based communication browser session initiation request. The computer-implemented method also includes loading a boot data object. The boot data object includes one or more predefined parameters of a booting operation stored locally on the client device and the boot data object is applicable to a plurality of executable software applications. The computer-implemented method further includes downloading, from a group-based communication system, at least one asset data and application data based on a specific application of the plurality of executable software applications. The at least one of the asset data and the application data is configured for generation of at least a portion of a display associated with the group-based communication browser session.

In some embodiments, the boot data object includes a static HTML payload. In some embodiments, the static HTML payload is constant for the plurality of executable software applications. In some embodiments, downloading at least one asset data and application data includes downloading the asset data and the application data in parallel. In some embodiments, one or more of the asset data or application data is stored in memory on the apparatus. In some embodiments, the computer-implemented method also includes generating a display associated with the group-based communication browser session while the apparatus is unconnected from the group-based communication system.

In another example embodiment, an apparatus is provided for background loading data. The apparatus includes at least one processor and at least one non-transitory memory including program code, the at least one non-transitory memory and the program code configured to, with the processor, cause the apparatus to at least execute a group-based communication browser session module stored in the at least one non-transitory memory. The computer program code instructions may also be configured to, when executed, cause the apparatus to cause a service worker to request an update for the group-based communication browser session module during execution of the group-based communication browser session module. The computer program code instructions may further be configured to, when executed, cause the apparatus to receive, via the service worker, the update for the group-based communication browser session module during the operation of the group-based communication browser session module. The computer program code instructions may still further be configured to, when executed, cause the apparatus to cache the update via the service worker. The computer program code instructions may also be configured to, when executed, cause the apparatus to restart the group-based communication browser session module after caching the update. Restarting the group-based communication browser session module includes updating at least a portion of the group-based communication browser session module to provide the update for display to a user.

In some embodiments, the service worker operates independently of operations of the group-based communication browser session module. In some embodiments, the request for an update for the group-based communication browser session module is repeated at a regular interval of time. In some embodiments, the update is cached while the group-based communication browser session module executes until restarting the group-based communication browser session module. In some embodiments, the group-based communication browser session module includes one or more of a boot data object, asset, or application data. In some embodiments, the request for an update includes requesting a version indicator for a current updated version of the group-based communication browser session module. In some embodiments, the computer program code instructions may also be configured to, when executed, cause the apparatus to restart the group-based communication browser session module at regular intervals.

In another example embodiment, a computer-program product is provided for background loading data. The computer program product includes at least one non-transitory computer-readable storage medium having computer-readable program code portions stored therein, the computer-readable program code portions includes an executable portion configured to execute a group-based communication browser session module stored at least one memory. The computer-executable program code portions also include program code instructions configured to cause a service worker to request an update for the group-based communication browser session module during execution of the group-based communication browser session module. The computer-executable program code portions further include program code instructions configured to receive, via the service worker, the update for the group-based communication browser session module during the operation of the group-based communication browser session module. The computer-executable program code portions still further include program code instructions configured to cache the update via the service worker. The computer-executable program code portions also include program code instructions configured to restart the group-based communication browser session module after caching the update. Restarting the group-based communication browser session module includes updating at least a portion of the group-based communication browser session module to provide the update for display to a user.

In some embodiments, the service worker operates independently of operations of the group-based communication browser session module. In some embodiments, the request for an update for the group-based communication browser session module is repeated at a regular interval of time. In some embodiments, the update is cached while the group-based communication browser session module executes until restarting the group-based communication browser session module. In some embodiments, the group-based communication browser session module includes one or more of a boot data object, asset data, or application data. In some embodiments, the request for an update includes requesting a version indicator for a current updated version of the group-based communication browser session module. In some embodiments, the computer-readable program code portions further include an executable portion configured to restart the group-based communication browser session module at regular intervals.

In yet another example embodiment, a computer-implemented method is provided for background loading data. The computer-implemented method includes executing a group-based communication browser session module stored in at least one memory. The computer-implemented method also includes causing a service worker to request an update for the group-based communication browser session module during execution of the group-based communication browser session module. The computer-implemented method further includes receiving, via the service worker, the update for the group-based communication browser session during the operation of the group-based communication browser session. The computer-implemented method still further includes caching the update via the service worker. The computer-implemented method also includes restarting the group-based communication browser session module after caching the update. Restarting the group-based communication browser session module includes updating at least a portion of the group-based communication browser session module to provide the update for display to a user.

In some embodiments, the service worker operates independently of operations of the group-based communication browser session module. In some embodiments, the request to an update for the group-based communication browser session module is repeated at a regular interval of time. In some embodiments, the update is cached while the group-based communication browser session module executes until restarting the group-based communication browser session module. In some embodiments, the group-based communication browser session module includes one or more of a boot data object, asset data, or application data. In some embodiments, the request for an update includes requesting a version indicator for a current updated version of the group-based communication browser session module.

In an example embodiment, an apparatus is provided for background updating an application. The apparatus includes at least one processor and at least one non-transitory memory including program code, the at least one non-transitory memory and the program code configured to, with the processor, cause the apparatus to at least activate a group-based communication browser session within a first display window of the apparatus. The computer program code instructions may also be configured to, when executed, cause the apparatus to transmit an update request for the group-based communication browser session to a group-based communication system upon determining that a window focus of the apparatus is associated with a second display window. The computer program code instructions may further be configured to, when executed, cause the apparatus to receive an update for the group-based communication browser session. The computer program code instructions may still further be configured to, when executed, cause the apparatus to cache the update for the group-based communication browser session via a memory of the apparatus. The computer program code instructions may also be configured to, when executed, cause the apparatus to refresh the group-based communication browser session based at least in part on the update upon determining that the window focus of the apparatus changes to the first display window.

In some embodiments, transmitting an update request is repeated at a predetermined interval of time. In some embodiments, the window focus is determined based at least in part on a user interacting with the given group-based communication browser session. In some embodiments, the window focus is determined based at least in part on the group-based communication browser session being rendered on the apparatus. In some embodiments, the first display window is positioned at least partially behind the second display window. In some embodiments, refreshing of the group-based communication browser session occurs when the group-based communication browser session is not in the window focus. In some embodiments, refreshing of the group-based communication browser session occurs when a user requests a refresh.

In another example embodiment, a computer-program product is provided for background updating an application The computer program product includes at least one non-transitory computer-readable storage medium having computer-readable program code portions stored therein, the computer-readable program code portions includes an executable portion configured to activate a group-based communication browser session within a first display window of an apparatus. The computer-executable program code portions also include program code instructions configured to transmit an update request for the group-based communication browser session to a group-based communication system upon determining that a window focus of the apparatus is on a second display window. The computer-executable program code portions further include program code instructions configured to receive an update for the group-based communication browser session. The computer-executable program code portions still further include program code instructions configured to cache the update for the group-based communication browser session via a memory of the apparatus. The computer-executable program code portions also include program code instructions configured to refresh the group-based communication browser session based at least in part on the update upon determining that the window focus of the apparatus changes to the first display window.

In some embodiment, transmitting an update request is repeated at a predetermined interval of time. In some embodiments, the window focus is determined based at least in part on a user interacting with the given group-based communication browser session. In some embodiments, the window focus is determined based at least in part on the group-based communication browser session being rendered on the apparatus. In some embodiments, the first display window is positioned at least partially behind the second display window. In some embodiments, refreshing of the group-based communication browser session occurs when the group-based communication browser session is not in the window focus. In some embodiments, refreshing of the group-based communication browser session occurs when a user requests a refresh.

In yet another example embodiment, a computer-implemented method is provided for background updating an application. The computer-implemented method includes activating a group-based communication browser session within a first display window of an apparatus. The computer-implemented method also includes transmitting an update request for the group-based communication browser session to a group-based communication system upon determining that a window focus of the apparatus is on a second display window. The computer-implemented method further includes receiving an update for the group-based communication browser session. The computer-implemented method still further includes caching the update for the group-based communication browser session via a memory of the apparatus. The computer-implemented method also includes refreshing the group-based communication browser session based at least in part on the update upon determining that the window focus of the apparatus changes to the first display window.

In some embodiments, transmitting an update request is repeated at a predetermined interval of time. In some embodiments, the window focus is determined based at least in part on a user interacting with the given group-based communication browser session. In some embodiments, the window focus is determined based at least in part on the group-based communication browser session being rendered on the apparatus. In some embodiments, the first display window is positioned at least partially behind the second display window. In some embodiments, refreshing of the group-based communication browser session occurs when the group-based communication browser session is not in the window focus.

In an example embodiment, an apparatus is provided for authenticating a user. The apparatus includes at least one processor and at least one non-transitory memory including program code, the at least one non-transitory memory and the program code configured to, with the processor, cause the apparatus to at least verify compliance with one or more security procedures for a given group-based communication browser session based on a comparison of a boot data object and an authentication data. The boot data object includes a set of standardized parameters of a booting operation and the authentication data includes a set of core information enabling access to the given group-based communication browser session. The computer program code instructions may also be configured to, when executed, cause the apparatus to receive group-based communication data specific to the group-based communication browser session from a group-based communication system. The computer program code instructions may further be configured to, when executed, cause the apparatus to display, via the apparatus, at least a portion of the group-based communication data specific to the group-based communication browser session.

In some embodiments, the authentication data includes data identifying previous authentication instances for one or more users. In some embodiments, the boot data object further includes data relating to one or more authentication standards. In some embodiments, the group-based communication data includes one or more of asset data or application data. In some embodiments, the authentication data includes data identifying an authentication cookie of one or more users. In some embodiments, the authentication cookie is stored in memory of the apparatus and the authentication cookie includes one or more group-based communication browser sessions for which the one or more users have access. In some embodiments, the operations are repeated on every booting operation of a given group-based communication browser session.

In another example embodiment, a computer-program product is provided for authenticating a user. The computer program product includes at least one non-transitory computer-readable storage medium having computer-readable program code portions stored therein, the computer-readable program code portions includes an executable portion configured to verify compliance with one or more security procedures for a given group-based communication browser session based on a comparison of a boot data object and an authentication data. The boot data object includes a set of standardized parameters of a booting operation and the authentication data includes a set of core information enabling access to the given group-based communication browser session. The computer-executable program code portions also include program code instructions configured to receive group-based communication data specific to the group-based communication browser session from a group-based communication system. The computer-executable program code portions further include program code instructions configured to display, via an apparatus, at least a portion of the group-based communication data specific to the group-based communication browser session.

In some embodiments, the authentication data includes data identifying previous authentication instances for one or more users. In some embodiments, the boot data object further includes data relating to one or more authentication standards. In some embodiments, the group-based communication data includes one or more of asset data, or application data. In some embodiments, the authentication data includes data identifying an authentication cookie of one or more users. In some embodiments, the authentication cookie is stored in memory of the apparatus and the authentication cookie includes one or more group-based communication browser sessions for which the one or more users have access. In some embodiments, the operations are repeated on every booting operation of a given group-based communication browser session.

In yet another example embodiment, a computer-implemented method is provided for authenticating a user. The computer-implemented method includes verifying compliance with one or more security procedures for a given group-based communication browser session based on a comparison of a boot data object and an authentication data. The boot data object includes a set of standardized parameters of a booting operation and the authentication data includes a set of core information enabling access to the given group-based communication browser session. The computer-implemented method also includes receiving group-based communication data specific to the group-based communication browser session from the group-based communication system. The computer-implemented method further includes displaying, via an apparatus, at least a portion of the group-based communication data specific to the group-based communication browser session.

In some embodiments, the authentication data includes data identifying previous authentication instances for one or more users. In some embodiments, the boot data object further includes data relating to one or more authentication standards. In some embodiments, the group-based communication data includes one or more of asset data, or application. In some embodiments, the authentication data includes data identifying an authentication cookie of one or more users. In some embodiments, the authentication cookie is stored in the memory of the apparatus and the authentication cookie includes one or more group-based communication browser sessions for which the one or more users have access.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Figure 1:
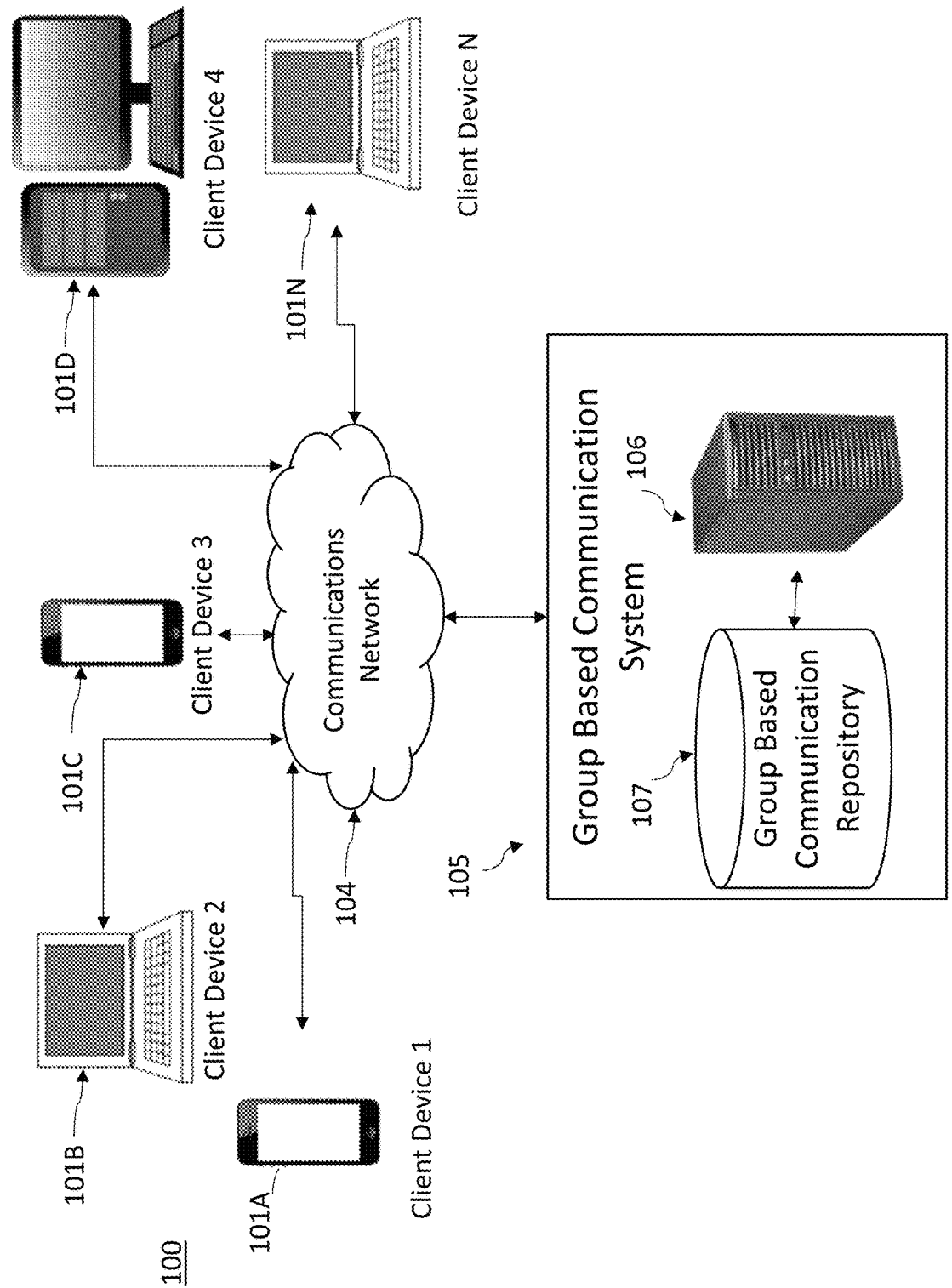
Figure 2A:
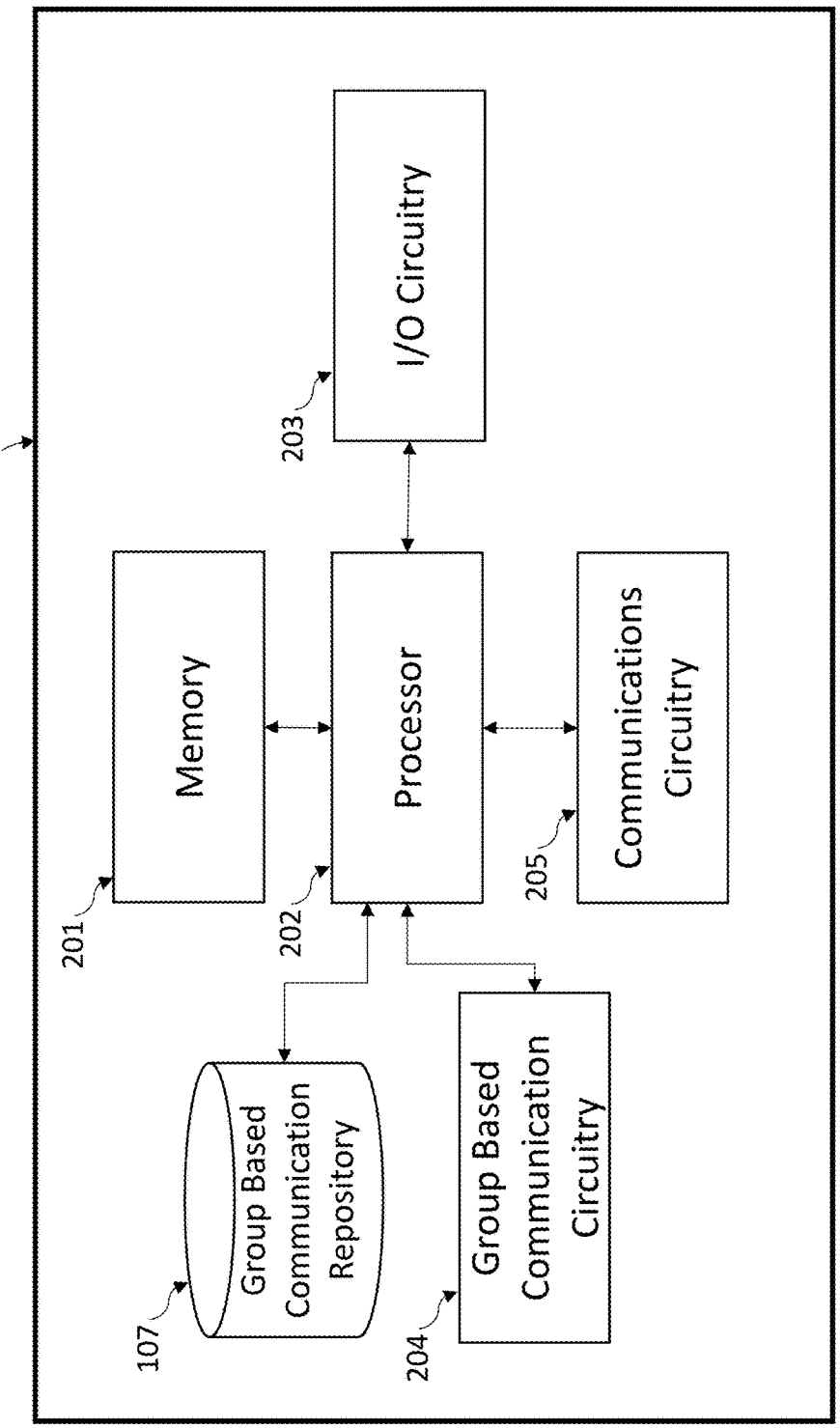
Figure 2B:
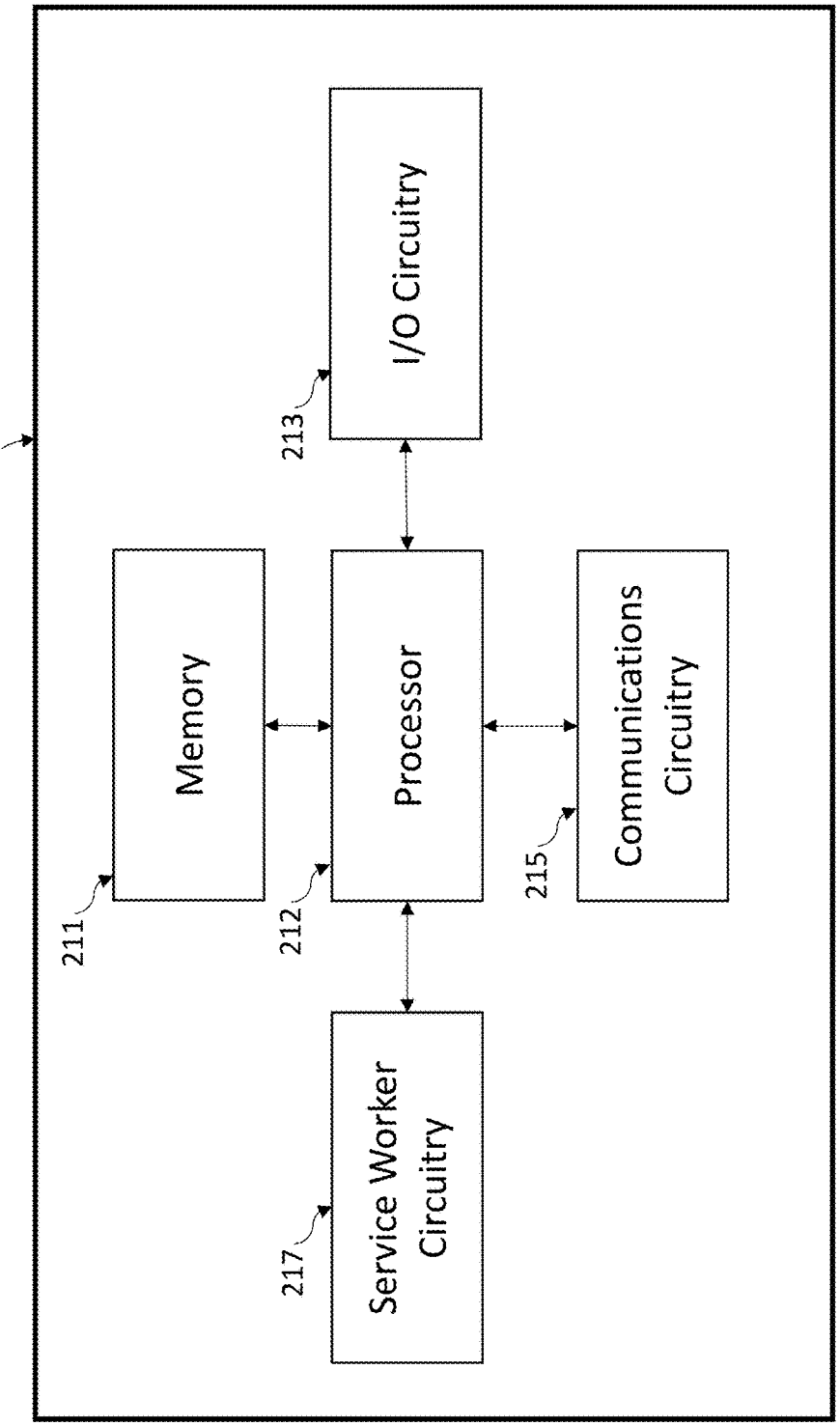

Having thus described the disclosure in general terms, reference will now be made to the accompanying drawings, which are not necessarily drawn to scale, and wherein:

FIG. 1 illustrates an example computing system within which embodiments of the present disclosure may operate;

FIGS. 2A and 2B show exemplary apparatuses for implementing embodiments of the present disclosure;

FIG. 3A shows a flow chart of the operations of booting up a group-based communication browser session in accordance with an example embodiment of the present disclosure;

FIG. 3B shows an example signal diagram of the flowchart shown in FIG. 3A in accordance with an example embodiment of the present disclosure;

FIG. 4A shows a flow chart of the operations of updating a group-based communication browser session in the background during operation in accordance with an example embodiment of the present disclosure;

FIG. 4B shows an example signal diagram of the flowchart shown in FIG. 4A in accordance with an example embodiment of the present disclosure;

FIG. 5A shows a flow chart of the operations of updating a group-based communication browser session that is out of window focus during operation in accordance with an example embodiment of the present disclosure;

FIG. 5B shows an example signal diagram of the flowchart shown in FIG. 5A in accordance with an example embodiment of the present disclosure;

FIG. 6A shows a flow chart of the operations of authenticating a user in accordance with an example embodiment of the present disclosure; and FIG. 6B shows an example signal diagram of the flowchart shown in FIG. 6A in accordance with an example embodiment of the present disclosure.

DETAILED DESCRIPTION OF VARIOUS EMBODIMENTS

Various embodiments of the present disclosure will now be described more fully hereinafter with reference to the accompanying drawings, in which some, but not all embodiments of the disclosure are shown. Indeed, the disclosure may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout.

Definitions

As used herein, the terms "data," "content," "digital content," "digital content object," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

The term "client device" refers to computer hardware and/or software that is configured to access a service made available by a server. The server is often (but not always) on another computer system, in which case the client device accesses the service by way of a network. Client devices may include, without limitation, smart phones, tablet computers, laptop computers, wearables, personal computers, enterprise computers, and the like.

"Group-based" is used herein to refer to a system, channel, message, or virtual environment that has security sufficient such that it is accessible only to a defined group of users. The group may be defined by common access credentials such as those of an organization or commercial enterprise. Access may further be facilitated by a validated request to join or an invitation to join transmitted by one group member user to another non-member user. Group identifiers (defined below) are used to associate data, information, messages, etc., with specific groups.

The term "group-based communication channel" refers to a virtual communications environment or feed that is configured to display messaging communications posted by channel members (e.g., validated users accessing the environment using client devices) that are viewable only to the members of the group. The format of the group-based communication channel may appear differently to different members of the group-based communication channel; however, the content of the group-based communication channel (i.e., messaging communications) will be displayed to each member of the group-based communication channel. For instance, a common group-based messaging communication set will be displayed to each member of the respective group-based communication channel such that the content of the group-based communication channel (i.e., messaging communications) will not vary per member of the group-based communication channel.

The term "user" should be understood to refer to an individual, group of individuals, business, organization, and the like; the users referred to herein are accessing a group-based communication or messaging system using client devices. Each user of the group-based communication system is associated with at least one group identifier. Each group identifier is a unique number. For example, in one embodiment, the group identifier may be stored as a 64 bit unsigned integer and represented externally (outside of memory) as a base-34 encoded string.

The terms "user profile," "user account," and "user account details" refer to information associated with a user, including, for example, a user identifier, one or more group-based communication channel identifiers associated with group-based communication channels that the user has been granted access to, one or more group identifiers for groups with which the user is associated, an indication as to whether the user is an owner of any group-based communication channels, an indication as to whether the user has any group-based communication channel restrictions, a plurality of messages, a plurality of emojis, a plurality of conversations, a plurality of conversation topics, an avatar, an email address, a real name (e.g., John Doe), a username (e.g., jdoe), a password, a real name, a time zone, a status, and the like. The user account details can include a subset designation of user credentials, such as, for example, login information for the user including the user's username and password.

The terms "group-based communication channel identifier" or "channel identifier" refer to one or more items of data by which a group-based communication channel may be identified. For example, a group-based communication channel identifier may comprise ASCII ("American Standard Code for Information Interchange") text, a pointer, a memory address, and the like.

The terms "group identifier" or "team identifier" refer to one or more items of data by which a group within a group-based communication system may be identified. For example, a group identifier may comprise ASCII text, a pointer, a memory address, and the like.

As used herein, the terms "messaging communication" and "message" refer to any electronically generated digital content object provided by a user using a client device and that is configured for display within a group-based communication channel. Message communications may include any text, image, video, audio or combination thereof provided by a user (using a client device). For instance, the user may provide a messaging communication that includes text as well as an image and a video within the messaging communication as message contents. In such a case, the text, image, and video would comprise the messaging communication or digital content object. Each message sent or posted to a group-based communication channel of the group-based communication system includes metadata comprising the following: a sending user identifier, a message identifier, message contents, a group identifier, and a group-based communication channel identifier. Each of the foregoing identifiers may comprise ASCII text, a pointer, a memory address, and the like.

A "sending user identifier" is associated with a collection of messages that are sent by a particular user (i.e., a client device associated with the particular user). These messages may be analyzed to determine context regarding the user (e.g., the user's expertise or interest in a topic may be determined based on the frequency of mention of the topic or key words associated with the topic within such messages).

Group-based communication system users are organized into organization groups (e.g., employees of each company may be a separate organization group) and each organization group may have one or more group-based communication channels (explained below) to which users may be assigned or which the users may join (e.g., group-based communication channels may represent departments, geographic locations such as offices, product lines, user interests, topics, issues, and/or the like). A group identifier may be used to facilitate access control for a message (e.g., access to the message, such as having the message return as part of search results in response to a search query, may be restricted to those users having the group identifier associated with their user profile). The group identifier may be used to determine context for the message (e.g., a description of the group, such as the name of an organization and/or a brief description of the organization, may be associated with the group identifier).

Group-based communication system users may join group-based communication channels. Some group-based communication channels may be globally accessible to those users having a particular organizational group identifier associated with their user profile (i.e., users who are members of the organization). Access to some group-based communication channels may be restricted to members of specified groups, whereby the group-based communication channels are accessible to those users having a particular group identifier associated with their user profile. The group-based communication channel identifier may be used to facilitate access control for a message (e.g., access to the message, such as having the message return as part of search results in response to a search query, may be restricted to those users having the group-based communication channel identifier associated with their user profile, or who have the ability to join the group-based communication channel). The group-based communication channel identifier may be used to determine context for the message (e.g., a description of the group-based communication channel, such as a description of a project discussed in the group-based communication channel, may be associated with the group-based communication channel identifier).

The term "group-based communication repository" refers to a location outside the client device where data is stored, accessed, modified and otherwise maintained by the group-based communication system. The stored data includes information that facilitates the operation of the group-based communication system. The group-based communication repository may be embodied as a data storage device or devices, as a separate database server or servers, or as a combination of data storage devices and separate database servers. Further, in some embodiments, the group-based communication repository may be embodied as a distributed repository such that some of the stored data is stored centrally in a location within the group-based communication system and other data stored in a single remote location or a plurality of remote locations. Alternatively, in some embodiments, the group-based communication repository may be distributed over a plurality of remote storage locations only.

As used herein, the term "asset" refers to a plurality of objects, such as a collection of communication objects, a collection of media objects, and/or the like used to render one or more components of a group-based communication interface. For example, various aspects of an asset may be displayed as a part of the group-based communication interface.

As used herein, the term "application asset" refers to a collection of non-group specific communication objects. An application asset can be used to render non-group specific components of a communication interface. Example application assets include webpage templates, web application script bundles, and non-group specific image assets.

As used herein, the term "media asset" refers to a collection of image, document, and message data that are designated as media objects. Example media objects may include image thumbnails for rendering communication interfaces (e.g., interface layout related images and third-party image icons), user avatars, custom emojis, and e-mail contents. Various media objects may include file objects, message objects (e.g., a message, a file, a plurality of messages (e.g., all messages within a communication channel), and/or the like. For example, a file object may be example of a message that may be provided as payload data within a container to a validated external resource to perform a requested processing action. A file object may be any of a variety of executable file types, such as a ".pdf" file, a ".docx" file, a ".xml" file, a ".html" file, a ".tp" file, and/or the like.

The term "group-based communication interface" refers to a virtual communications environment configured to facilitate user interaction with a group-based communications system. Each group-based communication interface is accessible and viewable to a select group of users (i.e., users that are associated with a selected group identifier), such as a group of employees of a business or organization (e.g., the Slack Corp. interface would be accessible and viewable to the Slack employees, however the ACME Corporation group-based communication interface would not be accessible and viewable to Slack employees). The group-based communication interface includes a plurality of group-based communication channels (e.g., a marketing channel, sales channel, accounting channel, etc.).

As used herein, the term "group-based communication browser session" refers to an information interchange session between a web browser installed on a client device and one or more data storage areas storing group-based communication objects. A group-based communication browser session is associated with a webpage in the web browser. The data storage area storing group-based communication objects includes a group-based communication repository communicating with a client device via a system 105 in the group-based communication system. The data storage storing group-based communication objects may include a local cache stored in a persistent local storage space of the client device, such as a group-based communication cache in the form of a group-based communication browser cache and/or a group-based communication service cache. In addition, a web browser installed on a client device may also communicate with a local storage engine stored in a memory of the client device, such as a group-based communication store, during a group-based communication browser session. A group-based communication browser session may support a web application, such as a JavaScript application. A group-based communication browser session may be associated with one, or multiple, group-based communication interfaces.

As used herein, the term "group-based communication browser session module" refers to the components used to render the group-based communication browser session to a client device. Examples of components of a group-based communication browser session may include a boot data object, application asset, and/or application data. Components of the group-based communication browser session module may be received from the group-based communication repository 107 and/or stored locally on a client device (e.g., in the memory 211 or service worker circuitry 217).

As used herein, the term "group-based communication service session" refers to a script capable of executing by a web browser installed on a client device supporting a browser session but separate from any webpage associated with a group-based communication browser session. A group-based communication service session may include a data storage (group-based communication service cache defined below) that supports a group-based communication browser session. A group-based communication service session may be configured to automatically fetch application assets. In some embodiments, the group-based communication service session may be configured to fetch the application assets on a periodic or trigger-based basis. The group-based communication service session may also be configured to automatically update itself periodically.

As used herein, the term "group-based communication store" refers to a collection of data in a storage space in a non-persistent data storage of the client device storing group-based communication objects associated with a group-based communication browser session. A group-based communication store may be associated with a web application supported by a group-based communication browser session. In some example embodiments, the group-based communication store may be implemented using Redux provided via Massachusetts Institute of Technology license, in particular, a Redux store library in Redux.

As used herein, the term "group-based communication browser cache" refers to a collection of data in a storage space in a persistent data storage of the client device storing group-based communication objects associated with one or more group-based communication browser sessions. One group-based communication browser cache may be associated with multiple workspaces. Data stored in a group-based communication browser cache may be copied from a group-based communication store based on a browser cache retention policy. Data stored in a group-based communication browser cache may be received from a group-based communication repository. In some example embodiments, the group-based communication browser cache may be implemented using Redux persist. In some embodiments using Redux persist, the group-based communication browser cache may include an authentication storage separate from Redux persist that is configured to store one or more of: an authentication API token, a user ID for active view in the last group-based communication browser session, an indication of locale (i.e., a language setting) associated with the group-based communication browser session.

As used herein, the term "group-based communication service cache" refers to a collection of data in a storage space in a persistent data storage of the client device storing group-based communication objects associated with one or more group-based communication service sessions. One group-based communication service cache may be associated with multiple workspaces. Data stored in a group-based communication service cache may be copied from a group-based communication store based on service cache retention policy. In some example embodiments, the group-based communication cache may be implemented using off-the-shelf libraries such as Redux persist.

As used herein, the term "group-based communication browser cache" refers to a collection of data in a storage space of the client device in a persistent data storage, such as a persistent data storage as part of memory 211, storing group-based communication objects associated with one or more group-based communication browser sessions. One group-based communication browser cache may be associated with multiple workspaces. Data stored in a group-based communication browser cache may be copied from a group-based communication store based on a browser cache retention policy. Data stored in a group-based communication browser cache may be previously received from a group-based communication repository. The browser cache retention policy may define retaining a defined number of user profiles, a defined number of group-based channels, a defined number of group-based messages, a defined number of files and/or metadata associated with the files, and the like. In some example embodiments, the group-based communication browser cache may be implemented using Redux persist.

As used herein, the term "group-based communication store" refers to a storage space in a non-persistent data storage of the client device storing group-based communication objects associated with a group-based communication browser session. A group-based communication store may be associated with a web application supported by a group-based communication browser session. In some example embodiments, the group-based communication store may be implemented using a Redux store. In some embodiments, the client device 101 may render a group-based communication interface using the previously fetched asset set and object set.

As used herein, the term "display window" refers to a rendering that is viewable on a user interface of a client device. In various embodiments, the client device may be configured to have a plurality of display windows that may be cycled through (e.g., some display windows may be covering another such that the other display window may be not be viewed at a given time) and/or otherwise optionally selected for interaction therewith. In various embodiments, display windows may be stacked upon one another such that one display window may be positioned at least partially behind another display window (the latter display window being in front of the former). The display window may be resizable. In some instances, the display window may encompass less than the entire client device display. In some instances, a display window may be bounded by a frame.

As used herein, the term "window focus" refers to an indicator associated with a display window running on a client device that indicates that the interface is currently viewable, active, or otherwise engageable via the display of the client device. For example, if the client device currently displays a window rendering a group-based communication interface on the foreground, the window rendering a group-based communication interface on the foreground has window focus. If the client device does not currently display the currently running window rendering a group-based communication interface, such as an instance where the currently running window rendering a group-based communication interface is demoted to behind another display window, the window rendering a group-based communication interface does not have window focus. In some instances, the window focus may be based on an interaction by a user (e.g., a user may click on a display window on the client device). The window focus may be based on the amount of a window that is visible in a given instance (e.g., what percentage of the window covered by another window).

As used herein, the term "service worker" refers to a script the group-based communication browser session runs in the background, separate from a web page. The service worker may access features not visible on a displayed web page and/or do not utilize user interaction. For example, service workers may be used to allow for features, such as push notifications and background sync. The service worker may have one or more static assets installed. The service worker may be responsible for requesting and/or downloading updates in the background during operation of a given group-based communication browser session on a client device. A singular group-based communication browser session may have one or more service workers.

Overview

Various embodiments generally relate to a method and apparatus for initiating and executing a group-based communication browser session on a client device.

Traditionally, a client device has to be connected via an active network connection (e.g., via the internet) to a group-based communication system and/or a group-based communication repository to initiate a group-based communication browser session rendering a group-based communication interface. A client device fetches data necessary to render the group-based communication interface from a group-based communication repository associated with a system 105 in a group-based communication system, then renders the group-based communication interface based at least in part on the data fetched. In various instances, the data fetched may include one or more objects, other substantive data, and operational data (e.g., style sheets, authentication data, etc.). Therefore, delays corresponding to data communication via the network are introduced in the process of receiving a group-based communication browser session initiation requests and/or when rendering a group-based communication browser session, among other potential bottlenecks, are introduced in providing data to a client device. In addition, a client device cannot initiate a group-based communication browser session or render a group-based communication interface if the client device is not connected to the group-based communication system.

Various embodiments of the present disclosure allow for a constant booting operation that may be independent of the application being loaded. Some embodiments of the present disclosure may also enable background updating of group-based communication browser sessions to update during operation and/or to be stored for use in future instances of the group-based communication browser sessions. In accordance with the embodiments disclosed herein, a group-based communication browser session may be booted with minimal delay attributable at least in part to data communication delays via a network connection between the client device and a group-based communication system.

In various embodiments, service workers operating on a client device communicate with a group-based communication repository to monitor whether an update to the group-based communication browser session is available for download/retrieval. In various embodiments, the service worker circuitry 217 may be configured to provide the system 105 with an indication of the most recent update. For example, the service worker circuitry 217 may transmit a request for update with a version indicator or a time stamp indicative of a most-recent update received by the service worker circuitry 217 for the given group-based communication browser session. By monitoring in the background, the user interaction with the group-based communication browser session may continue uninterrupted and the group-based communication browser session may then be refreshed to reflect retrieved updates in an instance the group-based communication browser session is not in use (e.g., such as the refreshing when group-based communication browser session is closed and restarted or the refreshing when the group-based communication browser session is not in the window focus at a given time).

Thus, the various embodiments disclosed provide for a more efficient, faster group-based communication browser session. Thus, the solutions provided in this disclosure may be employed to obtain a more efficient and improved group-based communication system.

Example System Architecture

Methods, apparatuses, and computer program products of the present invention may be embodied by any of a variety of devices. For example, the method, apparatus, and computer program product of an example embodiment may be embodied by a networked device (e.g., an enterprise system 105), such as a system 105 or other network entity, configured to communicate with one or more devices, such as one or more client devices. Additionally or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, or any combination of the aforementioned devices.

FIG. 1 illustrates an example computing system 100 within which embodiments of the present invention may operate. Users may access a group-based communication system 105 via a communications network 104 using client devices 101A-101N. The group-based communication system 105 may comprise a group-based communication system 105 in communication with at least one group-based communication repository 107.

Communications network 104 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, communications network 104 may include a cellular telephone, an 802.11, 802.16, 802.20, and/or WiMax network. Further, the communications network 104 may include a public network, such as the Internet, a private network, such as an intranet, or combinations thereof, and may utilize a variety of networking protocols now available or later developed including, but not limited to TCP/IP based networking protocols. For instance, the networking protocol may be customized to suit the needs of the group-based communication system. In some embodiments, the protocol is a custom protocol of JSON (JavaScript Object Notation) objects sent via a Websocket channel. In some embodiments, the protocol is JSON over RPC ("remote procedure call), JSON over REST ("Representational State Transfer")/HTTP ("HyperText Transfer Protocol"), and the like.

The group-based communication system 105 includes an at least one operation server(s) 106 accessible via the communications network 104. Collectively, the at least one operation server(s) 106 is configured for receiving messages transmitted from one or more client devices 101A-101N, storing the messages within database storage areas for individual communication channels, and/or for transmitting messages to appropriate client devices 101A-101N.

The group-based communication repository 107 may be embodied as a data storage device such as a Network Attached Storage (NAS) device or devices, or as a separate database server or servers. The group-based communication repository 107 includes information accessed and stored by the group-based communication system 105 to facilitate the operations of the group-based communication system 105. For example, the group-based communication repository 107 may include, without limitation, a plurality of messaging communications organized among a plurality of group-based communication channels, and/or the like.

The client devices 101A-101N may be any computing device as defined above. Electronic data received by the group-based communication system 105 from the client devices 101A-101N may be provided in various forms and via various methods. For example, the client devices 101A-101N may include desktop computers, laptop computers, smartphones, netbooks, tablet computers, wearables, and the like.

In embodiments where a client device 101A-101N is a mobile device, such as a smartphone or tablet, the client device 101A-101N may execute an "app" to interact with the group-based communication system 105. Such apps are typically designed to execute on mobile devices, such as tablets or smartphones. For example, an app may be provided that executes on mobile device operating systems such as iOS®, Android®, or Windows®. These system 105s typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications. Communication with hardware and software modules executing outside of the app is typically provided via application programming interfaces (APIs) provided by the mobile device operating system.

Alternatively, the client device 101A-101N may interact with the group-based communication system 105 via a web browser. As yet another example, the client device 101A-101N may include various hardware or firmware designed to interface with the group-based communication system 105.

In some embodiments of an exemplary group-based communication system 105, a message or messaging communication may be sent from a client device 101A-101N to a group-based communication system 105. In various implementations, the message may be sent to the group-based communication system 105 over communications network 104 directly by a client device 101A-101N, the message may be sent to the group-based communication system 105 via an intermediary such as a message server, and/or the like. For example, the client device 101A-101N may be a desktop, a laptop, a tablet, a smartphone, and/or the like that is executing a client application (e.g., a group-based communication app). In one implementation, the message may include data such as a message identifier, sending user identifier, a group identifier, a group-based communication channel identifier, message contents (e.g., text, emojis, images, links), attachments (e.g., files), message hierarchy data (e.g., the message may be a reply to another message), third party metadata, and/or the like. In one embodiment, the client device 101A-101N may provide the following example message, substantially in the form of a (Secure) Hypertext Transfer Protocol ("HTTP(S)") POST message including eXtensible Markup Language ("XML") formatted data, as provided below:

```
POST /authrequest.php HTTP/1.1
Host: www.example.com
Content-Type: Application/XML
Content-Length: 667
<?XML version = "1.0" encoding = "UTF-8"?>
<auth_request>
    <timestamp>2020-12-31 23:59:59</timestamp>
    <user_accounts_details>
        <user_account_credentials>
            <user_name>ID_user_1</user_name>
            <password>abc123</password>
            //OPTIONAL <cookie>cookieID</cookie>
            //OPTIONAL <digital_cert_link>www.mydigitalcertificate.com/JohnDoeDaDoeDoe@gmail.com/mycertifcate.dc</digital_cert_link>
            //OPTIONAL <digital_certificate>_DATA_</digital_certificate>
        </user_account_credentials>
    </user_accounts_details>
    <client_details> //iOS Client with App and Webkit
            //it should be noted that although several client details
            //sections are provided to show example variants of client
            //sources, further messages will include only on to save
            //space
        <client_IP>10.0.0.123</client_IP>
        <user_agent_string>Mozilla/5.0 (iPhone; CPU iPhone OS 7_1_1 like Mac OS X) AppleWebKit/537.51.2 (KHTML, like Gecko) Version/7.0 Mobile/11D201 Safari/9537.53</user_agent_string>
        <client_product_type>iPhone6,1</client_product_type>
        <client_serial_number>DNXXX1X1XXXX</client_serial_number>
        <client_UDID>3XXXXXXXXXXXXXXXXXXXXXXXXD</client_UDID>
        <client_OS>iOS</client_OS>
        <client_OS_version>7.1.1</client_OS_version>
        <client_app_type>app with webkit</client_app_type>
        <app_installed_flag>true</app_installed_flag>
        <app_name>MSM.app</app_name>
        <app_version>1.0 </app_version>
        <app_webkit_name>Mobile Safari</client_webkit_name>
        <client_version>537.51.2</client_version>
    </client_details>
    <client_details> //iOS Client with Webbrowser
```

```
        <client_IP>10.0.0.123</client_IP>
        <user_agent_string>Mozilla/5.0 (iPhone; CPU iPhone OS 7_1_1 like Mac OS X)
AppleWebKit/537.51.2 (KHTML, like Gecko) Version/7.0 Mobile/11D201
Safari/9537.53</user_agent_string>
        <client_product_type>iPhone6,1</client_product_type>
        <client_serial_number>DNXXX1X1XXXX</client_serial_number>
        <client_UDID>3XXXXXXXXXXXXXXXXXXXXXXXXD</client_UDID>
        <client_OS>iOS</client_OS>
        <client_OS_version>7.1.1</client_OS_version>
        <client_app_type>web browser</client_app_type>
        <client_name>Mobile Safari</client_name>
        <client_version>9537.53</client_version>
    </client_details>
    <client_details> //Android Client with Webbrowser
        <client_IP>10.0.0.123</client_IP>
        <user_agent_string>Mozilla/5.0 (Linux; U; Android 4.0.4; en-us; Nexus S
Build/IMM76D) AppleWebKit/534.30 (KHTML, like Gecko) Version/4.0 Mobile
Safari/534.30</user_agent_string>
        <client_product_type>Nexus S</client_product_type>
        <client_serial_number>YXXXXXXXXZ</client_serial_number>
        <client_UDID>FXXXXXXXXX-XXXX-XXXX-XXXX-
XXXXXXXXXXXX</client_UDID>
        <client_OS>Android</client_OS>
        <client_OS_version>4.0.4</client_OS_version>
        <client_app_type>web browser</client_app_type>
        <client_name>Mobile Safari</client_name>
        <client_version>534.30</client_version>
    </client_details>
    <client_details> //Mac Desktop with Webbrowser
        <client_IP>10.0.0.123</client_IP>
        <user_agent_string>Mozilla/5.0 (Macintosh; Intel Mac OS X 10_9_3)
AppleWebKit/537.75.14 (KHTML, like Gecko) Version/7.0.3
Safari/537.75.14</user_agent_string>
        <client_product_type>MacPro5,1</client_product_type>
        <client_serial_number>YXXXXXXXXZ</client_serial_number>
        <client_UDID>FXXXXXXXXX-XXXX-XXXX-XXXX-
XXXXXXXXXXXX</client_UDID>
        <client_OS>Mac OS X</client_OS>
        <client_OS_version>10.9.3</client_OS_version>
        <client_app_type>web browser</client_app_type>
        <client_name>Mobile Safari</client_name>
        <client_version>537.75.14</client_version>
    </client_details>
    <message>
        <message_identifier>ID_message_10</message_identifier>
        <team_identifier>ID_team_1</team_identifier>
        <channel_identifier>ID_channel_1</channel_identifier>
        <contents>That is an interesting invention. I have attached a copy our patent
policy.</contents>
        <attachments>patent_policy.pdf</attachments>
    </message>
</auth_request>
```

In the illustrated embodiment, the group-based communication system 105 comprises a plurality of operation server(s) 106 configured to receive messages transmitted between a plurality of client devices 101A-101N within a channel identified by a channel identifier and/or a group identifier, and to facilitate dissemination of those messages among client devices 101A-101N that collectively form the membership of the communication channel.

In some embodiments, data indicating responses may be associated with the message. For example, responses to the message by other users may include reactions (e.g., selection of an emoji associated with the message, selection of a "like" button associated with the message), clicking on a hyperlink embedded in the message, replying to the message (e.g., posting a message to the group-based communication channel interface in response to the message), downloading a file associated with the message, sharing the message from one group-based communication channel to another group-based communication channel, pinning the message, starring the message, and/or the like. In one implementation, data regarding responses to the message by other users may be included with the message, and the message may be parsed (e.g., using PHP commands) to determine the responses. In another implementation, data regarding responses to the message may be retrieved from a database. For example, data regarding responses to the message may be retrieved via a MySQL database command similar to the following:

```
SELECT messageResponses
FROM MSM_Message
WHERE messageID = ID_message_10.
```

For example, data regarding responses to the message may be used to determine context for the message (e.g., a social score for the message from the perspective of some user). In another example, data regarding responses to the message may be analyzed to determine context regarding the user (e.g., the user's expertise in a topic may be determined based on the responses to the user's message regarding the topic).

In embodiments, attachments may be included with the message. If there are attachments, file objects may be associated with the message. In one implementation, the message may be parsed (e.g., using PHP commands) to determine file names of the attachments. For example, file contents may be analyzed to determine context for the message (e.g., a patent policy document may indicate that the message is associated with the topic "patents").

In embodiments, third party metadata may be associated with the message. For example, third party metadata may provide additional context regarding the message or the user that is specific to a company, group, group-based communication channel, and/or the like. In one implementation, the message may be parsed (e.g., using PHP commands) to determine third party metadata. For example, third party metadata may indicate whether the user who sent the message is an authorized representative of the group-based communication channel (e.g., an authorized representative may be authorized by the company to respond to questions in the group-based communication channel).

In embodiments, a conversation primitive may be associated with the message. In one implementation, a conversation primitive is an element used to analyze, index, store, and/or the like messages. For example, the message may be analyzed by itself, and may form its own conversation primitive. In another example, the message may be analyzed along with other messages that make up a conversation, and the messages that make up the conversation may form a conversation primitive. In one implementation, the conversation primitive may be determined as the message, a specified number (e.g., two) of preceding messages and a specified number (e.g., two) of following messages. In another implementation, the conversation primitive may be determined based on analysis of topics discussed in the message and other messages (e.g., in the channel) and/or proximity (e.g., message send order proximity, message send time proximity) of these messages.

In embodiments, various metadata, determined as described above, and/or the contents of the message may be used to index the message (e.g., using the conversation primitive) and/or to facilitate various facets of searching (i.e., search queries that return results from the operation servers 106). Metadata associated with the message may be determined and the message may be indexed in the operation server(s) 106. In one embodiment, the message may be indexed such that a company's or a group's messages are indexed separately (e.g., in a separate index associated with the group and/or company that is not shared with other groups and/or companies). In one implementation, messages may be indexed at a separate distributed repository (e.g., to facilitate data isolation for security purposes). If there are attachments associated with the message, file contents of the associated files may be used to index such files in the operation server(s) 106 to facilitate searching. In one embodiment, the files may be indexed such that a company's or a group's files are indexed at a separate distributed repository. Similarly, as discussed herein, app data associated with various validated external resources and/or processing actions may be stored in association with a particular group's messages, such that app data associated with a plurality of groups are stored separately.

The group-based communication system 105 may be embodied by one or more computing systems, such as apparatus 200A shown in FIG. 2A. The apparatus 200A may include a processor 202, a memory 201, input/output circuitry 203, communications circuitry 205, group-based communication repository 107 and group-based communications circuitry 204. The apparatus 200A may be configured to execute the operations described herein. Although the components are described with respect to functional limitations, it should be understood that the particular implementations necessarily include the use of particular hardware. It should also be understood that certain of the components described herein may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus should therefore be understood to include particular hardware configured to perform the functions associated with the particular circuitry as described herein.

The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the apparatus 200A may provide or supplement the functionality of particular circuitry. For example, the processor 202 may provide processing functionality, the memory 201 may provide storage functionality, the communications circuitry 205 may provide network interface functionality, and the like.

In some embodiments, the processor 202 (and/or co-processor or any other processing circuitry assisting or otherwise associated with the processor) may be in communication with the memory 201 via a bus for passing information among components of the apparatus. The memory 201 may be non-transitory and may include, for example, one or more volatile and/or non-volatile memories. In other words, for example, the memory may be an electronic storage device (e.g., a computer readable storage medium). The memory 201 may be configured to store information, data, content, applications, instructions, or the like, for enabling the apparatus 200A to carry out various functions in accordance with example embodiments of the present disclosure.

The processor 202 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 202 may be configured to execute instructions stored in the memory 201 or otherwise accessible to the processor. Alternatively, or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present disclosure while configured accordingly. Alternatively, as another example, when the processor is embodied as an executor of software instructions, the instructions may specifically configure the processor to perform the algorithms and/or operations described herein when the instructions are executed.

In some embodiments, the apparatus 200A may include input/output circuitry 203 that may, in turn, be in communication with processor 202 to provide output to the user and, in some embodiments, to receive an indication of a user input. The input/output circuitry 203 may comprise a user interface and may include a display and may comprise a web user interface, a mobile application, a client device, a kiosk, or the like. In some embodiments, the input/output circuitry 203 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 201, and/or the like).

The communications circuitry 205 may be embodied as or comprise a device or circuitry embodied in either hardware or a combination of hardware and software that is configured to receive and/or transmit data from/to a network and/or any other device, circuitry, or module in communication with the apparatus 200A. In this regard, the communications circuitry 205 may include, for example, a network interface for enabling communications with a wired or wireless communication network. For example, the communications circuitry 205 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

The group-based communications circuitry 204 includes hardware configured to support a group-based communication system. The group-based communications circuitry 204 may utilize processing circuitry, such as the processor 202, to perform these actions. The group-based communications circuitry 204 may send and/or receive data from group-based communication repository 107. In some implementations, the sent and/or received data may be of enterprise-based digital content objects organized among a plurality of group-based communication channels. It should also be appreciated that, in some embodiments, the group-based communications circuitry 204 may include a separate processor, specially configured field programmable gate array (FPGA), or application specific interface circuit (ASIC).

The client device 101 may be embodied by one or more computing systems, such as apparatus 200B shown in FIG. 2B. The apparatus 200B may include a processor 212, a memory 211, input/output circuitry 213, communications circuitry 215, and service worker circuitry 217. The apparatus 200B may be configured to execute the operations described herein. Although the components are described with respect to functional limitations, it should be understood that the particular implementations necessarily include the use of particular hardware. It should also be understood that certain of the components described herein may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus should therefore be understood to include particular hardware configured to perform the functions associated with the particular circuitry as described herein.

The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the apparatus 200B may provide or supplement the functionality of particular circuitry. For example, the processor 212 may provide processing functionality, the memory 211 may provide storage functionality, the communications circuitry 215 may provide network interface functionality, and the like.

In some embodiments, the processor 212 (and/or co-processor or any other processing circuitry assisting or otherwise associated with the processor) may be in communication with the memory 211 via a bus for passing information among components of the apparatus. In other words, for example, the memory may be an electronic storage device (e.g., a computer readable storage medium). The memory 211 may be configured to store information, data, content, applications, instructions, or the like, for enabling the apparatus 200B to carry out various functions in accordance with example embodiments of the present disclosure.

The memory 211 may include a non-volatile computer-readable storage medium as a persistent storage such as a floppy disk, flexible disk, hard disk, solid-state storage (SSS) (e.g., a solid state drive (SSD), solid state card (SSC), solid state module (SSM)), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

The memory 211 may also include a volatile computer-readable storage medium as a non-persistent storage such as a include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double information/data rate synchronous dynamic random access memory (DDR SDRAM), double information/data rate type two synchronous dynamic random access memory (DDR2 SDRAM), double information/data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

The processor 212 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 212 may be configured to execute instructions stored in the memory 211 or otherwise accessible to the processor. Alternatively, or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present disclosure while configured accordingly. Alternatively, as another example, when the processor is embodied as an executor of software instructions, the instructions may specifically configure the processor to perform the algorithms and/or operations described herein when the instructions are executed.

In some embodiments, the apparatus 200B may include input/output circuitry 213 that may, in turn, be in communication with processor 212 to provide output to the user and, in some embodiments, to receive an indication of a user input. The input/output circuitry 213 may comprise a user interface and may include a display and may comprise a web user interface, a mobile application, a client device, a kiosk, or the like. In some embodiments, the input/output circuitry 213 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 211, and/or the like).

The communications circuitry 215 may be embodied as or comprise a device or circuitry embodied in either hardware or a combination of hardware and software that is configured to receive and/or transmit data from/to a network and/or any other device, circuitry, or module in communication with the apparatus 200B. In this regard, the communications circuitry 215 may include, for example, a network interface for enabling communications with a wired or wireless communication network. For example, the communications circuitry 215 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

The service worker circuitry 217 may be embodied as or comprise a device or circuitry, to allow for service workers to operate in the background, separate from a web page. In various embodiments, the service worker circuitry 217 may be embodied at least partially by the processor 212 and/or memory 211. In some embodiments, the service worker circuitry 217 may be configured with similar functionality to the processor 212 and/or memory 211. In various embodiments, the service worker circuitry 217 may be configured for requesting and/or downloading updates in the background during operation of a given group-based communication browser session on a client device. The service worker circuitry 217 may be configured to allow for one or more service workers for a given group-based communication browser session.

As described above and as will be appreciated based on this disclosure, embodiments of the present disclosure may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Similarly, embodiments may take the form of a computer program code stored on at least one non-transitory computer-readable storage medium. Any suitable computer-readable storage medium may be utilized including non-transitory hard disks, CD-ROMs, flash memory, optical storage devices, or magnetic storage devices.

Booting Operation for a Group-based Communication Browser Session

FIG. 3A shows a flow chart of the operation performed by an apparatus in accordance with an example embodiment for the booting operations of a client device 101.

Referring now to Block 310 of FIG. 3A, the apparatus (e.g., a processor 212 of client device 101) is configured for generating a group-based communication browser session initiation request. In various embodiments, the group-based communication browser session initiation request may be generated based on a user input requesting a group-based communication browser session transmitted via I/O circuitry 213. The user input requesting to initiate a group-based communication browser session may take the form of inputting a uniform resource locator (URL) address into a browser installed on the client device 101 and requesting to access the URL. In some embodiments, the URL address is associated with a specific work space, such as yourteam.slack.com/messages. In some alternative embodiments, the URL address is not associated with a specific workspace.

Referring now to Block 320 of FIG. 3A, the client device 101 is configured for loading a boot data object comprising one or more predefined parameters of a booting operation stored locally. In some embodiments, the boot data object may be preloaded on a client device before the operations discussed herein. For example, the client device may be configured for, via the communications circuitry 215, the service worker circuitry 217, or the like, receiving the boot data object from the system 105. For example, the boot data object may be stored in the group-based communication repository. In various embodiments, the boot data object may be independent of a specific application. For example, the boot data object may have one or more standard components allowing the apparatus to load said boot data object absent any downloading. In some embodiments, the boot data object may include at least one of authentication information, security information, booting operations, and/or the like. In various embodiments, the boot data object may include an identifier (e.g., the name) of the application being booted, authentication information (e.g., as discussed herein), and the like.

In some embodiments, the boot data object may be a static HTML payload. In some embodiments, the static HTML payload may be constant for a plurality of group-based communication browser sessions.

Referring now to Block 330 of FIG. 3A, the client device 101 may be configured, via the processor 212, the communications circuitry 215, or the like, for downloading at least one asset data and application data based on a specific application of the plurality of executable software application. In various embodiments, the asset and application data may be downloaded in parallel.

In various embodiments, the client device 101 may attempt to communicate with system 105, for example, via the internet (e.g., the client device 101 may send a signal, which if the client device is connected to the internet may be returned by the system 105). If the client device 101 is determined to be in communication with the system 105, for example, via the internet, the client device 101 is configured to determine whether a group-based communication service cache is available. If the client device 101 is determined to be disconnected from the internet (or otherwise disconnected from the system 105), the client device is configured to initiate an offline workflow. In various embodiments, the group-based communication service cache may be a storage space in a persistent data storage of the client device 101 storing group-based communication objects associated with one or more group-based communication browser sessions. One group-based communication service cache may be associated with multiple workspaces. Data stored in the group-based communication service cache may have a corresponding identifier based on the associated workspace. Alternatively, the data stored in the group-based communication service cache may have other identifying features in order to associate the data with the appropriate workspace. Data stored in group-based communication service cache may be previously copied from a group-based communication store. Data stored in group-based communication service cache may also be populated by direct copies of data from a group-based communication repository 107. In some example embodiments, the group-based communication cache may be implemented using a service worker (e.g., such as a publicly provided service worker). In some embodiments, the client device 101 may be configured to fetch an application asset set from the group-based communication repository 107.

In some embodiments, the assets include a static HTML (Hypertext Markup Language) object that contains inlined JavaScript. The static HTML may be configured to initiate additional data fetches in the future upon user request or automatically and may be configured to load a web application script from a content delivery network. For example, a group-based communication browser session may have multiple different layers (e.g., a website has multiple pages within the same website).

In some embodiments, the client device 101 may fetch the asset set from a group-based communication repository by sending a request to receive the asset set to a system 105 associated with the group-based communication repository in a group-based communication system 105. In various embodiments, the request may include an identifier for a given group-based communication browser session. For example, the request may include a URL pointing to the asset set to be fetched. Upon receiving such a request, the system 105 may proceed to send the asset set to client device 101 (e.g., via the Internet). Once the client device 101 receives the asset set from the system 105 in the group-based communication system 105, for example via I/O circuitry 213, the client device 101 may store the fetched asset set in the group-based communication service cache. In some embodiments, the cache may contain the most up-to-date fetched asset set (e.g., any non-up-to-date fetched asset sets may be deleted). In some embodiments, a predetermined number of fetched asset sets may be stored in the cache. For example, the cache may include the last three fetched asset sets. In some embodiments, the amount of fetched asset sets and/or the length of time in the cache may determine whether a fetched asset set may be deleted. In some embodiments, the clearing of the cache may occur during booting process of a group-based communication browser session. In some embodiments, the client device 101 may also store the fetched asset set in a group-based communication store or a group-based communication browser cache.

In some embodiments, the client device 101 is configured to fetch an asset set from the group-based communication service cache. In some embodiments, the client device 101 may be configured to fetch a group-based media asset set from the group-based communication service cache.

In some embodiments, the client device 101 may be configured to fetch a group-based communication object set from the group-based communication repository 107. Metadata indicating utilization related to a specific user profile of the group-based communication objects may be stored on the group-based communication repository 107. In some embodiments, upon fetching the group-based communication object set from a group-based communication repository 107, the client device 101 may be configured to store the fetched object set in a group-based communication store.

Referring now to FIG. 3B, an example signal diagram of the flowchart shown in FIG. 3A is provided in accordance with an example embodiment of the present disclosure. As shown, in various embodiments, the one or more client devices 101A-101N may be in communication with the group-based communication server(s) 106 that is a part of the group-based communication system 105 (shown in FIG. 1). In various embodiments, the system 105 may be in communication with the group-based communication repository 107 (shown in FIG. 1) to carry out the operations shown.

Referring now to Block 310 of FIG. 3B, the client device 101 may be configured for generating a group-based communication browser session initiation request. The operations are the same as discussed in reference to Block 310 of FIG. 3A.

Referring now to Block 320 of FIG. 3B, based on the group-based communication browser session initiation request, the client device 101 may be configured for loading a boot data object comprising one or more predefined parameters of a booting operation stored locally. The operations are the same as discussed in reference to Block 320 of FIG. 3A.

Referring now to Block 322 of FIG. 3B, upon loading the boot data object, the client device 101 may be configured for transmitting a request for at least one asset and application data based on the specific application. In various embodiments, the request may be based on the group-based communication browser session initiation request.

Referring now to Block 324 of FIG. 3B, the system 105 may be configured for receiving the request for at least one asset and application data from the client device 101. In various embodiments, the request may indicate the specific application (e.g., group-based communication browser session) that the client device is set to display. Referring now to Block 326 of FIG. 3B, the system 105 is configured for transmitting at least one asset and application data based on the request. In various embodiments, the at least one asset and application data relates to the specific application to be displayed.

Referring now to Block 330 of FIG. 3B, the client device 101 may be configured for at least one asset data and application data based on a specific application of the plurality of executable software application. The operations are the same as discussed in reference to Block 330 of FIG. 3A

In various embodiments, the client device 101 may be configured to render a group-based communication interface using all of the previously fetched assets and objects. In some embodiments, after rendering the group-based communication interface, the client device 101 continues communication with a system 105, such as the system 105 in the group-based communication system 105. The client device 101 may fetch additional group-based communication objects and application assets. The use of at least some locally stored assets and objects allows for a more streamlined and efficient user experience by decreasing load times for a given application since there is a decrease in the reliance on downloads from the system 105. The continued communication may be used to update the group-based browser session as discussed in reference to FIGS. 4 and 5 below.

Updating During Operation

FIG. 4A shows a flowchart of the operations of an apparatus for updating an application during operation of the group-based communication browser session.

Referring now to Block 410 of FIG. 4A, the apparatus is configured for executing a group-based communication browser session module stored at the apparatus. In various embodiments, the group-based communication browser session module may include a boot data object, asset, and application data sufficient to render a group-based communication browser session to a user. In various embodiments, the group-based communication browser session module information may have been obtained such as by the operations described herein (e.g., obtained by a service worker during a previous operation). In some embodiments, the apparatus may be configured to fetch one or more components of the group-based communication browser session module from the system 105 in at least one instance. For example, the assets may be saved for a given application.

Referring now to Block 420 of FIG. 4A, the apparatus may be configured for causing a service worker to request an update for the group-based communication browser session module during execution of the group-based communication browser session module. In some embodiments, the service worker circuitry 217 may be configured to generate the request. In various embodiments, the request includes information relating to the current version (e.g., a version indicator discussed below). In some embodiments, the service worker transmits the request to the system 105, which upon determining whether an update is needed, transmitted the update back to the client device, as discussed below in reference to FIG. 4B. In some embodiments, the update may include various metadata information, such as a version indicator or the like. In various embodiments, the service worker may request an update at regular intervals (e.g., time). For example, the service worker may request an update every hour.

In some embodiments, the service worker circuitry 217 may be in communication with the system 105, such that the service worker circuitry 217 may receive a version indicator referencing the most up-to-date version of the group-based communication browser session, or one or more components therein (e.g., the assets). In some embodiments, the service worker circuitry 217 may be configured to determine whether the version indicator previously stored on the client device and the version indicator received from the system 105 indicate the same version of group-based communication browser session (e.g., assets). For example, if the indicator previously stored on the client device and the version indicator received from the system 105 indicate the same version of the assets, the assets previously fetched and rendered by client device 101 is up to date. In such an instance, the client device 101 will not need to update the previously fetched assets. Alternatively, as shown in the signal diagram of FIG. 4B, the system 105 may receive the version indicator from the service worker circuitry 217 and the system 105 may determine whether an update is needed.

In an instance a version indicator previously stored on the client device and the version indicator received from the system 105 do not indicate the same version of the group-based communication browser session (e.g., assets), the group-based communication browser session (e.g., assets previously fetched and rendered by client device 101) may not be up to date. Thereafter, the client device may be configured to delete the out of date information stored in the group-based communication service cache. In some embodiments, additional objects may be updated using the operations discussed herein. In some embodiments, the operations may be used to receive and/or cache feature data relating to the group-based communication browser session and/or a feature flag. In such an embodiment, the feature data and/or feature flag data may be information (e.g., text) indicating given features and/or feature flags are enabled or disabled. In various embodiments, feature data and/or feature flags may include information relating to parts of a group-based communication browser session being tested for potential future use. As specific examples, experimental features of an updated version of the group-based communication interface may be reflected within one or more objects and/or assets of the updated data, and the status of these objects may be reflected within objects, as discussed herein.

In some embodiments, in an instance the assets are out of date, the client device 101 may selectively delete a subset of assets stored within the group-based communication service cache that are not the same version as the assets stored in the group-based communication repository 107. For example, the assets stored on the group-based communication repository 107 may be a version dated 2018.05.05. Assets on the client device may include HTML templates version dated 2018.05.05 and web application scripts version dated 2018.03.07. As such, the client device will delete the web application scripts but not the HTML templates.

Referring now to Block 430 of FIG. 4A, the apparatus is configured for receiving the update for the group-based communication browser session module during the operation of the group-based communication browser session module. In some embodiments, the update may indicate that one or more components of the group-based communication module had been changed. For example, the update may indicate that at least a portion of a component may have been removed or added. In some embodiments, the update may include the entire group-based communication browser session module (e.g., including both old and new portions). In some embodiments, the update for the group-based communication browser session module may be less than all of the group-based communication browser session module. For example, the update may include only the changes to the group-based communication browser session module at a given time. In some embodiments, the update may include the entirety of a specific component of a group-based communication browser session module (e.g., a new asset may be received for a given application). For example, a given group-based communication browser session module may have a plurality of individual components (e.g., separate JavaScript and/or Cascading Style Sheets (CSS) files) and only some of the components may change during a given update. In such examples, only the changed components may be received by the apparatus.

Referring now to Block 440 of FIG. 4A, the apparatus is configured for caching the update for the group-based communication browser session. In various embodiments, the service worker circuitry 217 may be configured with memory to cache the update for future use.

In some embodiments, the client device 101 may replace the assets stored in the service cache with assets fetched from the group-based communication repository 107. For example, the assets may be used to initiate a group-based communication browser session in the future. In some embodiments, the assets may be "one reload behind", such that the assets stored in the group-based communication service cache are up to date to the date that the client device last started the group-based communication browser session.

Referring now to Block 450 of FIG. 4A, the apparatus is configured for restarting the group-based communication browser session module after caching the update. In some embodiments, restarting the group-based communication browser session module includes updating at least a portion of the group-based communication browser session module to provide the update for display to a user. In some embodiments, the restart may occur in an instance the user requests a refresh of the group-based communication browser session module. In some embodiments, the apparatus may be configured to restart the group-based communication browser session module in an instance the user exits a given group-based communication browser session. For example, a user may close an application and the operations of Block 450 may be carried out the next time the user requests the same application. In some embodiments, the restart may be carried out on a regular interval of time (e.g., an update may occur every hour regardless of use by a user). In some embodiments, a message may be provided to the user interface of the client device that an update is available (e.g., a user may select to restart the application or otherwise).

In some embodiments, in an instance the client device 101 determines that the group-based communication browser session does not have window focus, the client device 101 may be configured to reload the group-based communication browser session to re-render the group-based communication. For example, an application may be reloaded in an instance another application is stacked over the given application.

In some embodiments, in an instance the client device 101 determines that the group-based communication browser session does have window focus, the client device 101 may be configured to set a reload flag indicating that the client device 101 will reload and re-render the group-based communication interface as soon as the group-based communication interface loses window focus. In some embodiments, the group-based communication browser may be reloaded even when the group-based communication browser session is in window focus. For example, a group-based communication browser session may be reloaded based on some type of inactivity trigger (e.g., in an instance the user has not interacted with said session in a particular period of time). In various embodiments, the operations of FIG. 4A may be repeated during operation.

Referring now to FIG. 4B, an example signal diagram of the flowchart shown in FIG. 4A is provided in accordance with an example embodiment of the present disclosure. As shown, in various embodiments, the one or more client devices 101A-101N may be in communication with the group-based communication server(s) 106 that is a part of the group-based communication system 105 (shown in FIG. 1). In various embodiments, the system 105 may be in communication with the group-based communication repository 107 (shown in FIG. 1) to carry out the operations shown.

Referring now to Block 410 of FIG. 4B, the client device 101 is configured for executing a group-based communication browser session module stored at the apparatus. The operations are the same as discussed in reference to Block 410 of FIG. 4A. In some instances, the group-based communication browser session module may be executed based on an input from a user.

Referring now to Block 420 of FIG. 4B, the client device 101 is configured for causing a service worker to request an update for the group-based communication browser session module during execution of the group-based communication browser session module. The operations are the same as discussed in reference to Block 420 of FIG. 4A. For example, the update request may be in the form of the current version of a group-based communication browser session module.

Referring now to Block 422, the system 105 is configured for receiving the update request. In some instances, based on the request, the system 105 is configured for determining whether an update is necessary for a given group-based communication browser session module. In an example where the system 105 determines that an update is not necessary, the system 105 may return an indication to the client device 101 that the group-based communication browser session module is up-to-date. Referring now to Block 424 of FIG. 4B, in an instance the system 105 determines that an update is necessary, the system 105 is configured for causing the transmission of the update for a group-based communication browser session module. As discussed in reference to Block 430 of FIG. 4A above, the update may include a portion or the entirety of the group-based communication browser session module.

Referring now to Block 430 of FIG. 4B, the client device 101 is configured for receiving the update for the group-based communication browser session module during the operation of the group-based communication browser session module. The operations are the same as discussed in reference to Block 430 of FIG. 4A.

Referring now to Block 440 of FIG. 4B, based on the reception of the update from the system 105, the client device 101 is configured for caching the update. The operations are the same as discussed in reference to Block 440 of FIG. 4A. Referring now to Block 450 of FIG. 4B, the client device 101 is configured for restarting the group-based communication browser session module after caching the update. The operations are the same as discussed in reference to Block 440 of FIG. 4A.

Loading Assets Out of Focus

FIG. 5A shows a flowchart of an example operation of an apparatus for loading assets while an application is out of focus.

Referring now to Block 510 of FIG. 5A, the apparatus is configured for activating a group-based communication browser session within a first display window of the apparatus. In various embodiments, the first display window may be based on the view screen of a client device 101 (e.g., what a user can see on a client device). The group-based communication browser session may be initiated as discussed in reference to Block 410 of FIG. 4A.

Referring now to Block 520 of FIG. 5A, the apparatus is configured for monitoring the window focus of the apparatus. In various embodiments, the window focus may be based on the whether a group-based communication browser session is rendered to a screen of a client device 101 (e.g., can a user see the group-based communication browser session on a client device). In some embodiments, the window focus may be based on the interaction of a given group-based communication browser session by a user. For example, a group-based communication browser session may be displayed to a screen of a client device, but the user may not be interacting with the given group-based communication browser session. In some embodiments, the window focus may be monitored continuously. In some embodiments, the client device 101 may include means, such as the processor 212, for inactivity tracking. For example, the client device 101 may monitor the applications being used at a given time. In some embodiments, the apparatus may be configured to monitor whether the display window of the group-based communication browser session is the frontmost display window of the apparatus (e.g., such that other display windows are not in front of the group-based communication interface display window). In some embodiments, the apparatus may be configured to monitor whether the display window of the group-based communication browser session is at least partially covered by one or more display windows and/or minimized to a taskbar or the like.

Referring now to Block 530 of FIG. 5A, the apparatus is configured for transmitting an update request for the group-based communication browser session upon determining that the window focus of the apparatus is on a second display window. In various embodiments, the update request may be transmitted to the to a group-based communication system 105. In various embodiments, the apparatus may be configured to cause the service worker to request an update for the group-based communication browser session as discussed in reference to Block 420 of FIG. 4A. In some embodiments, the service worker circuitry 217 may be configured to generate the request. In various embodiments, the request includes information relating to the current version (e.g., a version indicator discussed below). In some embodiments, the service worker transmits the request to the system 105, which upon determining whether an update is needed, transmitted the update back to the client device, as discussed below in reference to FIG. 4B. In some embodiments, the update may include various metadata information, such as a version indicator or the like. In various embodiments, the operations of the service workers relating to requesting and obtaining the update may be similar to discussed in reference to FIGS. 4A and 4B above.

In some embodiments, the service worker circuitry 217 may be in communication with the system 105, such that the service worker circuitry 217 may receive a version indicator referencing the most up-to-date version of the group-based communication browser session, or one or more components therein (e.g., the assets). In some embodiments, the service worker circuitry 217 may be configured to determine whether the version indicator previously stored on the client device and the version indicator received from the system 105 indicate the same version of group-based communication browser session (e.g., assets). For example, if the indicator previously stored on the client device and the version indicator received from the system 105 indicate the same version of the assets, the assets previously fetched and rendered by client device 101 is up to date. In such an instance, the client device 101 will not need to update the previously fetched assets. Alternatively, the service worker circuitry 217 may transmit the version indicator for the currently stored group-based communication browser session and the system 105 may determine whether an update is needed.

In an instance a version indicator previously stored on the client device and the version indicator received from the system 105 do not indicate the same version of the group-based communication browser session (e.g., assets), the group-based communication browser session (e.g., assets previously fetched and rendered by client device 101) may not up to date. Thereafter, the client device may be configured to delete the out of data information stored in the group-based communication service cache. In some embodiments, additional objects may be updated using the operations discussed herein. In some embodiments, the operations may be used to receive and cache feature data relating to the group-based communication browser session and/or a feature flag. In such an embodiment, the feature data and/or feature flag data may be information (e.g., text) indicating given features and/or feature flags are enabled or disabled. As discussed above, feature data and/or feature flags may include information relating to parts of a group-based communication browser session being tested for potential future use.

In some embodiments, in an instance the assets are out of date, instead of deleting the entire set of assets stored in the group-based communication service cache, the client device 101 may selectively delete a subset of assets that are not the same version as the assets stored in the group-based communication repository 107. For example, the assets stored on the group-based communication repository 107 may be a version dated 2018.05.05. Assets on the client device may include HTML templates version dated 2018.05.05 and web application scripts version dated 2018.03.07. As such, the client device will delete the web application scripts but not the HTML templates.

Referring now to Block 540 of FIG. 5A, the apparatus is configured for receiving an update for the group-based communication browser session. In some embodiments, the reception of the update may be the same as discussed in reference to block 430 of FIG. 4A. In some embodiments, the update may indicate that one or more components of the group-based communication module had been changed. For example, the update may indicate that at least a portion of a component may have been removed or added. In some embodiments, the update may include the entire group-based communication browser session module (e.g., including both old and new portions). In some embodiments, the update may include the entirety of a specific component of a group-based communication browser session module (e.g., a new asset may be received for a given application).

Referring now to Block 550 of FIG. 5A, the apparatus is configured for caching the update for the group-based communication browser session via a memory of the apparatus. In some embodiments, the storing of the update may be the same as discussed in reference to the caching of Block 440 of FIG. 4A. In various embodiments, the service worker circuitry 217 may be configured with memory to cache the update for future use.

In some embodiments, the client device 101 may replace the assets stored in the service cache with assets fetched from the group-based communication repository 107. For example, the assets may be used to initiate a group-based communication browser session in the future. In some embodiments, the assets may be "one reload behind", which means that the assets stored in the group-based communication service cache is up to date to the date that the client device last start the group-based communication browser session.

Referring now to Block 560 of FIG. 5A, the apparatus is configured for refreshing the group-based communication browser session based at least in part on the update upon determining that the window focus of the apparatus changes to the first display window. In some embodiments, the apparatus may be configured to refresh the group-based communication browser session in an instance the group-based communication browser session is not in the window focus of the apparatus. In some embodiments, in an instance the window focus returns to the group-based communication browser session before the apparatus refreshes the update, the apparatus may continue operating the group-based communication browser session with the old (e.g., pre-update) code.

In some embodiments, in an instance the client device 101 determines that the group-based communication browser session does not have window focus, the client device 101 may be configured to reload the group-based communication browser session to re-render the group-based communication.

In some embodiments, in an instance the client device 101 determines that the group-based communication browser session does have window focus, the client device 101 may be configured to set a reload flag which indicate that the client device 101 will reload and re-render the group-based communication interface as soon as the group-based communication interface loses window focus.

Referring now to FIG. 5B, an example signal diagram of the flowchart shown in FIG. 5A is provided in accordance with an example embodiment of the present disclosure. As shown, in various embodiments, the one or more client devices 101A-101N may be in communication with the group-based communication server(s) 106 that is a part of the group-based communication system 105 (shown in FIG. 1). In various embodiments, the system 105 may be in communication with the group-based communication repository 107 (shown in FIG. 1) to carry out the operations shown.

Referring now to Block 510 of FIG. 5B, the client device 101 is configured for activating a group-based communication browser session within a first display window. The operations are the same as discussed in reference to Block 510 of FIG. 5A. For example, the activation may be based on a user input.

Referring now to Block 520 of FIG. 5B, the client device 101 is configured for monitoring the window focus of the apparatus. The operations are the same as discussed in reference to Block 520 of FIG. 5A. Referring now to Block 530 of FIG. 5, the client device 101 is configured for an update request for the group-based communication browser session upon determining that the window focus of the apparatus is on a second display window. The operations are the same as discussed in reference to Block 530 of FIG. 5A

Referring now to Block 532 of FIG. 5, the system 105 is configured for receiving the update request for the group-based communication browser session. In some instances, based on the request, the system 105 is configured for determining whether an update is necessary for a given group-based communication browser session module. In an example where the system 105 determines that an update is not necessary, the system 105 may return an indication to the client device 101 that the group-based communication browser session module is up-to-date. Referring now to Block 534 of FIG. 5B, in an instance the system 105 determines that an update is necessary, the system 105 is configured for causing the transmission of the update for a group-based communication browser session in response to the update request. As discussed in reference to Block 540 of FIG. 5A above, the update may include a portion or the entirety of the group-based communication browser session module.

Referring now to Block 540 of FIG. 5B, the client device 101 is configured for receiving the update for the group-based communication browser session. The operations are the same as discussed in reference to Block 540 of FIG. 5A. Referring now to Block 550 of FIG. 5B, the client device 101 is configured for storing the update for the group-based communication browser session. The operations are the same as discussed in reference to Block 550 of FIG. 5A. Referring now to Block 560 of FIG. 5B, the client device 101 is configured for refreshing the group-based communication browser session based at least in part on the update upon determining that the window focus of the apparatus changes to the first display window. The operations are the same as discussed in reference to Block 560 of FIG. 5A.

Authentication Process

FIG. 6A shows a flowchart of an example operation of an apparatus for authenticating a user for a given group-based communication browser session. Referring now to Block 610 of FIG. 6A, the apparatus is configured for defining a boot data object. In some embodiments, the boot data object includes a set of standardized parameters of a booting operation. The boot data object may be the same as discussed in reference to Block 320 of FIG. 3A. In some embodiments, the boot data object may include information relating to authentication information. In various embodiments, the boot data object may be predefined before the operations discussed herein (e.g., the operations may begin at Block 620 referenced below). In various embodiments, the boot data object may include an authentication payload and a boot data payload. In some embodiments, the authentication payload may include a hash table with information about individual users based on a given group-based communication browser session. For example, the authentication payload may include the user identifier and an application program interface (API) token (e.g., an identifier for a given group-based communication browser session). In some embodiments, the authentication payload may also include various other identifiers relating to subsets of the group-based communication browser session. For example, the authentication payload may additionally comprise one or more group identifiers for which authentication (and access)

is requested, one or more enterprise identifiers for which authentication (and access) is requested, image files to be utilized as icons for the one or more groups and/or enterprises, and/or the like. In some embodiments, the boot data payload may include information relating to a user, such as some or all of the group-based communication browser sessions the user has access, user preferences, group-based communication browser session preferences, and/or the like.

In various embodiments, as discussed below in reference to FIG. 6B, the client device 101 may be configured to send an authentication request. In some embodiments, the authentication request may include data relating to a user profile and/or one or more group-based communication browser sessions a client device 101 may be attempting to access. In some embodiments, the system 105 may be configured to receive the authentication request and in response generate an authentication data (e.g., a hidden page of data and/or data received from a HTTP request).

Referring now to Block 620 of FIG. 6A, the apparatus is configured for comparing a portion of the boot data object with a portion of authentication data received from the system 105. In various embodiments, the authentication data (e.g., hidden page of data) includes a set of core information enabling access to the given group-based communication browser session. In an example embodiment, the authentication requirements contained by the boot data object may be compared with the authentication data (e.g., hidden page) to determine whether a given user has access to the group-based communication browser session. As discussed above, in some embodiments, the authentication data (e.g., hidden page of data) may be received from the system 105. In some embodiments, the authentication data (e.g., hidden page of data) may be stored locally on the client device 101 upon receiving the authentication data (e.g., hidden page of data) from the system 105.

In some embodiments, the client device 101 may have a valid authentication cookie for a given user. In some embodiments, the authentication cookie may be created, for example, by the system 105 based on successful previous authentication processes. In some embodiments, the authentication cookie may be provided to the client device via the system 105. In some embodiments, the authentication cookie may be stored on the client device 101 and access to the authentication cookie may be restricted, such as restricted from web application scripts like JavaScripts. In some embodiments, the token is an API token stored locally in the client device 101 in an authentication storage in the group-based communication browser cache. In various embodiments, the authentication cookie may be modified in response to a determination that the user logs into a group-based communication browser session, the user logs out of a group-based communication browser session, the group-based communication browser session expires, the user changes his/her password, or the like.

Referring now to Block 630 of FIG. 6A, the apparatus is configured for verifying compliance with one or more security procedures for a given group-based communication browser session based on the comparison of the boot data object and the authentication data (e.g., hidden page of data). In various embodiments, the authentication data (e.g., hidden page) may also contain information about previous permissions for a given user (e.g., a user may have previously been allowed to access a given group-based communication browser session). In various embodiments, the group-based communication system 105 may be configured to verify the group-based communication browser sessions during generation of the authentication data. Moreover, one or more tokens included in the authentication payload (e.g., a unique user identifier, a group identifier, an enterprise identifier, and/or the like) may be authenticated for each API request transmitted from the apparatus.

Referring now to Block 640 of FIG. 6A, the apparatus is configured for receiving group-based communication data specific to the group-based communication browser session. Various group-based communication data received may allow for the rendering of the group-based communication browser session to the client device as discussed herein. In various embodiments, the group-based communication data specific to the group-based communication browser session may be received from the system 105. In some embodiments, the group-based communication data specific to the group-based communication browser session may be stored on the client device during operation. Additionally, various operations discussed herein may be completed in the background upon authentication for a given group-based communication browser session. In various embodiments, the group-based communication data specific to the group-based communication browser session may include verification information relating to a user (e.g., an indication whether a user is allowed access to a group-based communication browser session).

Referring now to Block 650 of FIG. 6A, the apparatus is configured for displaying at least a portion of the group-based communication data specific to the group-based communication browser session. In some embodiments, the displaying may be as a result of receiving group-based communication data specific to the group-based communication browser session discussed above in reference to Block 640.

Referring now to FIG. 6B, an example signal diagram of the flowchart shown in FIG. 6A is provided in accordance with an example embodiment of the present disclosure. As shown, in various embodiments, the one or more client devices 101A-101N may be in communication with the group-based communication server(s) 106 that is a part of the group-based communication system 105 (shown in FIG. 1). In various embodiments, the system 105 may be in communication with the group-based communication repository 107 (shown in FIG. 1) to carry out the operations shown.

Referring now to Block 610 of FIG. 6B, the client device 101 is configured for defining a boot data object. The operations are the same as discussed in reference to Block 610 of FIG. 6A. Referring now to Block 612 of FIG. 6B, the client device 101 is configured to cause the transmission of an authentication request to the system 105. In such an embodiment, the authentication request may include information relating to a user and/or a group-based communication browser session attempting to be accessed by a user. Referring now to Block 614 of FIG. 6B, the system 105 is configured to receive an authentication request and according to Block 616 of FIG. 6B, the system 105 is configured to generate a hidden page of data (or other data accessible via an HTTP request) based on the authentication request. In some embodiments, authentication data (e.g., one or more hidden pages) may be stored on the system 105 (e.g., on the group-based communication repository 107).

Referring now to Block 620 of FIG. 6B, the system 105 is configured for comparing a portion of the boot data object with a portion of an authentication data received from the system 105. The operations are the same as discussed in reference to Block 620 of FIG. 6A. Referring now to Block 630 of FIG. 6B, the system 105 is configured for verifying compliance with one or more security procedures for a given group-based communication browser session based on the comparison of the boot data object and the authentication data (e.g., hidden page of data). The operations are the same as discussed in reference to Block 630 of FIG. 6A. Referring now to Block 634 of FIG. 6B, the group-based communication system 105 (e.g., the server(s) 106) may cause the transmission of group-based communication data specific to the group-based communication browser session. In some embodiments, the causing of the transmission may be based on the indication of compliance determined by the system 105. In various embodiments, the group-based communication data specific to the group-based communication browser session may be sent to the client device 101 independent of an indication of compliance. For example, the group-based communication data specific to the group-based communication browser session may be sent to a client device 101 before verification of compliance, but the client device 101 does not allow the user access to the group-based communication browser session. Referring now to Block 640 of FIG. 6B, the client device is configured for receiving group-based communication data specific to the group-based communication browser session. The operations are the same as discussed in reference to Block 640 of FIG. 6A. In various embodiments, a authentication may be valid until the system 105 indicates otherwise (e.g., the client device 101 may operate the group-based communication browser session in off-line mode until the client device 101 communicates with the system 105 to determine the authentication has lapsed). Referring now to Block 650 of FIG. 6B, the client device 101 is configured for displaying at least a portion of the group-based communication data specific to the group-based communication browser session. The operations are the same as discussed in reference to Block 650 of FIG. 6A. In various embodiments, one or more of the assets may be independent of the group-based communication browser session (e.g., JavaScript, CSS, fonts, images, and the like). In such an embodiment, no authentication may be necessary to view such assets (e.g., upon entering a given URL, these assets may be loaded, but other group-based communication browser session specific assets may not be loaded until the authentication process is conducted).

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

As described above, FIGS. 3A, 4A, 5A, and 6A illustrate flowcharts of apparatuses and methods according to example embodiments of the invention. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the disclosures set forth herein will come to mind to one skilled in the art to which these disclosures pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. An apparatus for initiating a group-based communication browser session, the apparatus comprising at least one processor and at least one non-transitory memory including program code, the at least one non-transitory memory and the program code configured to, with the at least one processor, cause the apparatus to at least:
generate, via the at least one processor of the apparatus, a group-based communication browser session initiation request;
load a boot data object preloaded on a client device, the boot data object being associated with the group-based communication browser session to be booted on the client device,
wherein the boot data object comprises one or more predefined parameters of a booting operation stored locally on the client device, wherein the boot data object is applicable to a plurality of executable software applications, and
wherein the boot data object comprises at least one group identifier identifying at least one group-based communication channel of a group-based communication system to which a specific group-based communication system user associated with the client device has access;
download, from the group-based communication system facilitating communication between a set of validated users who are associated with a workspace of the group-based communication system, at least one asset data and application data based on a specific application of the plurality of executable software applications; and
generating a display associated with the group-based communication browser session while the apparatus is unconnected from the group-based communication system,
wherein the at least one asset data and the application data are configured for generation of at least a portion of the display associated with the group-based communication browser session, and
wherein the at least one asset data and the application data are downloaded based on metadata indicating group-based communication system utilization related to a use by the specific group-based communication system user of at least one specific group-based communication channel.

2. The apparatus of claim 1, wherein the boot data object comprises a static HTML payload.

3. The apparatus of claim 2, wherein the static HTML payload is constant for the plurality of executable software applications.

4. The apparatus of claim 1, wherein downloading the at least one asset data and the application data comprises downloading the at least one asset data and the application data in parallel.

5. The apparatus of claim 1, wherein one or more of the at least one asset data or the application data is stored in memory on the apparatus.

6. The apparatus of claim 1, wherein generation of the group-based communication browser session initiation request comprises generating the group-based communication browser session initiation request based at least in part on received user input.

7. A computer program product for initiating a group-based communication browser session, the computer program product comprising at least one non-transitory computer-readable storage medium having computer-readable program code portions stored therein, the computer-readable program code portions comprising an executable portion configured to:
generate, via at least one processor of a client device, a group-based communication browser session initiation request;
load a boot data object preloaded on the client device, the boot data object being associated with the group-based communication browser session to be booted on the client device,
wherein the boot data object comprises one or more predefined parameters of a booting operation stored locally on the client device, wherein the boot data object is applicable to a plurality of executable software applications, and
wherein the boot data object comprises at least one group identifier identifying at least one group-based communication channel of a group-based communication system to which a specific group-based communication system user associated with the client device has access;
download, from the group-based communication system facilitating communication between a set of validated users who are associated with a workspace of the group-based communication system, at least one asset data and application data based on a specific application of the plurality of executable software applications; and
generating a display associated with the group-based communication browser session while the client device is unconnected from the group-based communication system,
wherein the at least one asset data and the application data are configured for generation of at least a portion of the display associated with the group-based communication browser session, and
wherein the at least one asset data and the application data are downloaded based on metadata indicating group-based communication system utilization related to a use by the specific group-based communication system user of at least one specific group-based communication channel.

8. The computer program product of claim 7, wherein the boot data object comprises a static HTML payload.

9. The computer program product of claim 8, wherein the static HTML payload is constant for the plurality of executable software applications.

10. The computer program product of claim 7, wherein downloading the at least one asset data and the application data comprises downloading the at least one asset data and the application data in parallel.

11. The computer program product of claim 7, wherein one or more of the at least one asset data or the application data is stored in memory on the client device.

12. The computer program product of claim 7, wherein generation of the group-based communication browser session initiation request comprises generating the group-based communication browser session initiation request based at least in part on received user input.

13. A computer-implemented method for initiating a group-based communication browser session, the computer-implemented method comprising:
generating, via at least one processor of a client device, a group-based communication browser session initiation request;

loading a boot data object preloaded on the client device, the boot data object being associated with the group-based communication browser session to be booted on the client device, wherein the boot data object comprises one or more predefined parameters of a booting operation stored locally on the client device, wherein the boot data object is applicable to a plurality of executable software applications, and wherein the boot data object comprises at least one group identifier identifying at least one group-based communication channel of a group-based communication system to which a specific group-based communication system user associated with the client device has access;

downloading, from the group-based communication system facilitating communication between a set of validated users who are associated with a workspace of the group-based communication system, at least one asset data and application data based on a specific application of the plurality of executable software applications; and generating a display associated with the group-based communication browser session while the client device is unconnected from the group-based communication system, wherein the at least one asset data and the application data are configured for generation of at least a portion of the display associated with the group-based communication browser session, and wherein the at least one asset data and the application data are downloaded based on metadata indicating group-based communication system utilization related to a use by the specific group-based communication system user of at least one specific group-based communication channel.

14. The computer-implemented method of claim 13, wherein the boot data object comprises a static HTML payload.

15. The computer-implemented method of claim 14, wherein the static HTML payload is constant for the plurality of executable software applications.

16. The computer-implemented method of claim 13, wherein downloading the at least one asset data and the application data comprises downloading the at least one asset data and the application data in parallel.

17. The computer-implemented method of claim 13, wherein one or more of the at least one asset data or the application data is stored in memory on the client device.

* * * * *